United States Patent [19]

Enlow et al.

[11] Patent Number: 5,686,186
[45] Date of Patent: Nov. 11, 1997

[54] THERMOFORMABLE CONDUCTIVE LAMINATE AND PROCESS

[75] Inventors: Howard H. Enlow, Munster; Scott W. Huffer, Crown Point; Frederick Young, Schererville; William J. Buehne, Hammond, all of Ind.

[73] Assignee: Avery Dennison Corporation, Pasadena, Calif.

[21] Appl. No.: 487,488

[22] Filed: Jun. 7, 1995

Related U.S. Application Data

[62] Division of Ser. No. 316,818, Oct. 3, 1994, Pat. No. 5,490,893, which is a continuation of Ser. No. 67,527, May 24, 1993, abandoned, which is a continuation-in-part of Ser. No. 887,535, May 22, 1992, abandoned.

[51] Int. Cl.$^6$ .................................................. B32B 27/00
[52] U.S. Cl. ............................ 428/423.1; 428/423.3; 428/423.5; 428/423.7; 428/424.4; 428/424.6; 428/424.8; 428/480; 428/483; 428/522; 428/688; 428/934
[58] Field of Search ........................... 428/423.1, 423.3, 428/423.5, 423.7, 424.4, 424.6, 424.8, 480, 483, 522, 688, 934

[56] References Cited

U.S. PATENT DOCUMENTS

| | | | |
|---|---|---|---|
| 3,963,647 | 6/1976 | Straub | 252/511 |
| 4,196,064 | 4/1980 | Harms et al. | 204/147 |
| 4,349,601 | 9/1982 | Brueggemann et al. | 428/323 |
| 4,520,062 | 5/1985 | Ungar et al. | 156/230 X |
| 4,587,160 | 5/1986 | Williams et al. | 428/288 |
| 4,686,108 | 8/1987 | Nason et al. | 427/27 |
| 4,824,506 | 4/1989 | Hoerner et al. | 156/245 |
| 4,844,955 | 7/1989 | Graefe et al. | 428/424.4 |
| 5,000,809 | 3/1991 | Adesko et al. | 156/230 |
| 5,194,328 | 3/1993 | Suzuki et al. | 428/328 |
| 5,203,941 | 4/1993 | Spain et al. | 156/244.11 X |
| 5,484,838 | 1/1996 | Helms et al. | 524/496 |

Primary Examiner—Mark D. Sweet
Attorney, Agent, or Firm—Christie, Parker & Hale, LLP

[57] ABSTRACT

A process for making a thermoformable conductive plastic laminate for use in making plastic parts adapted for electrostatic spray painting of a uniform high quality paint finish includes forming a matte release coated casting sheet, casting an electrically conductive polymer in thin film form on the casting sheet, drying to form a conductive primer coat, and transfer-laminating the conductive coating to a thin, thermoformable plastic face sheet. The matte release coat has a fine particulate filler that transfers a micro-toughened matte surface to the conductive primer coat. The conductive primer includes a polyester resin containing a fine particulate conductive material such as carbon black and, preferably, an anti-blocking agent such as fumed silica. The primer coated face sheet can be thermoformed and bonded to a underlying plastic substrate panel. The conductive primer has sufficient elongation and maintains uniform electrical surface conductivity and film thickness throughout the transfer-laminating, thermoforming and substrate panel-cladding process. The uniform surface resistivity of the conductive primer film is sufficient to permit electrostatic spray painting of the finished contoured panel and in one embodiment produces a Class "A" quality exterior automotive paint finish on the resulting panel.

17 Claims, 8 Drawing Sheets

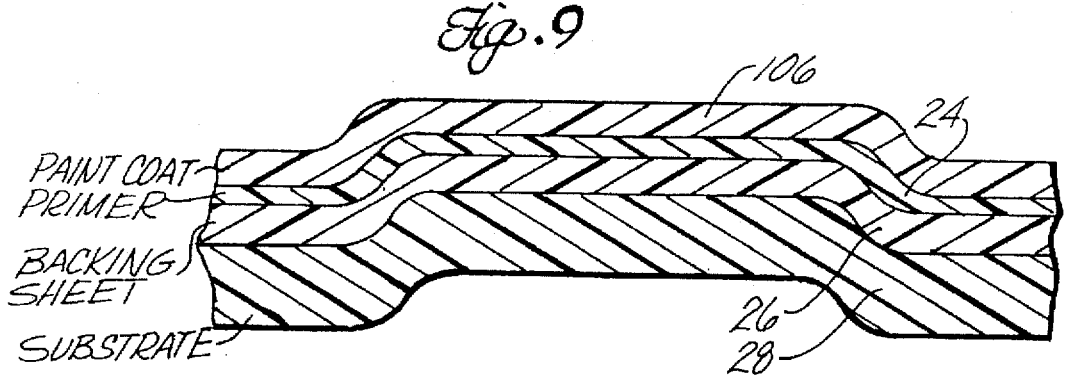
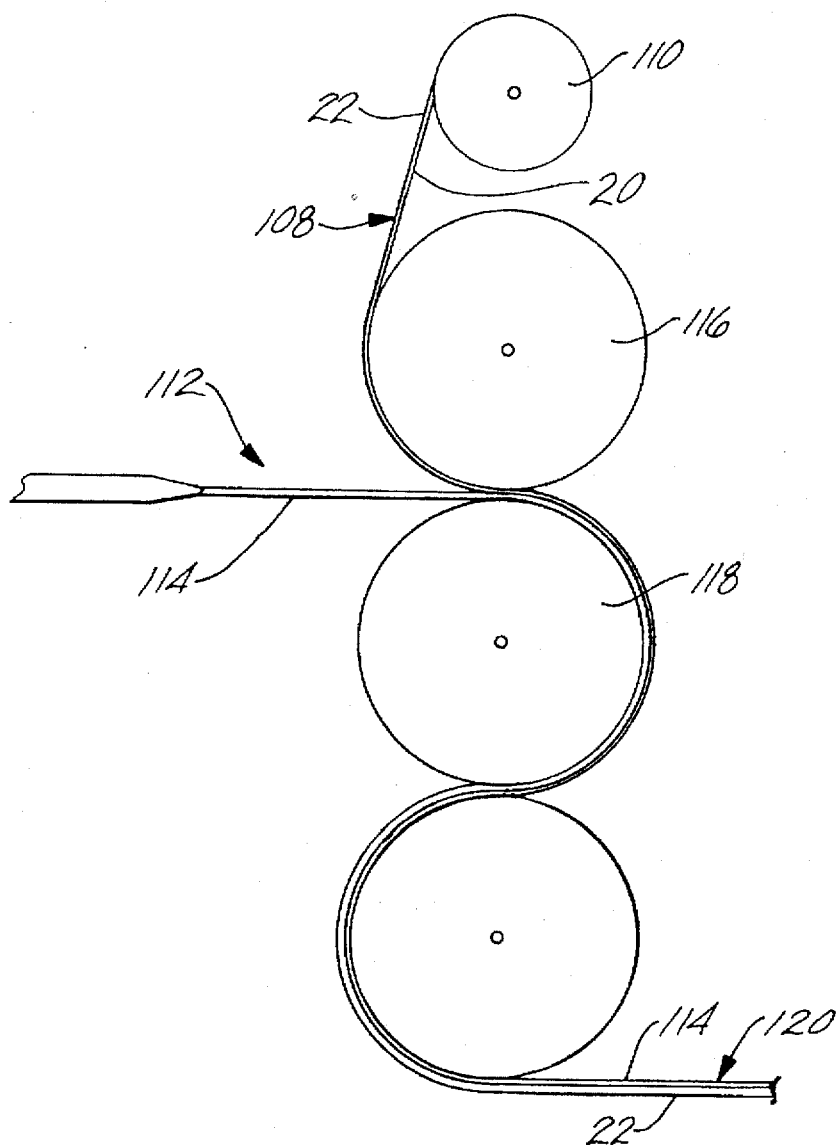

THERMOFORMABLE CONDUCTIVE LAMINATE AND PROCESS

CROSS-REFERENCE TO RELATED APPLICATION

This is a division of application Ser. No. 08/316,818 filed Oct. 3, 1994 now U.S. Pat. No. 5,490,893 which is a continuation of application Ser. No. 08/067,527, filed May 24, 1993, now abandoned, which is a continuation-in-part of application Ser. No. 07/887,535, filed May 22, 1992 now abandoned.

FIELD OF THE INVENTION

This invention relates to the use of a thermoformable conductive laminate in the electrostatic painting of plastic substrate panels.

BACKGROUND OF THE INVENTION

One embodiment of the present invention relates generally to the electrostatic painting of plastics. Although the invention is described below with relation to the electrostatic spray painting of plastic car body panels, it should be understood that the invention has further uses which will become more apparent from the description to follow.

In a typical electrostatic spray painting process, the spray head is maintained at a high voltage (50–140 KV) while the object being sprayed (the substrate) is electrically grounded. When a metal substrate is painted, it is relatively simple to maintain the metal at ground potential. In the electrostatic painting process, particles (paint droplets) are charged by an electrode in the spray head, and a charged spray cloud from the spray head is attracted to the metal surface by the high voltage difference. This process greatly reduces over-spray and produces a high quality surface on the painted metal parts. For these reasons, and others, electrostatic spray painting techniques have been used for many years in the automotive industry for spray painting exterior body panels made of sheet metal.

In recent years, the automotive industry has increased its use of plastic materials for exterior car body panels and trim parts. The predominant reasons are weight-reduction and the fact that car builders have had available more sophisticated high impact strength plastics such as polycarbonates. To a large extent, the future success of plastics for large car body panels will depend on their ability to be painted "on-line" in the assembly plant with a class "A" quality appearance similar to painted metal car body panels. Electrostatic spray painting of plastic car body panels has been used for years. However, difficulties arise when using electrostatic spray techniques for painting plastic substrates. The problem is particularly difficult when the objective is to paint plastics with the same high quality and appearance as metal parts using electrostatic paint spray equipment.

In order to electrostatically spray paint plastic substrates, a number of technical problems must be overcome. For instance, electrostatic charges accumulate on the surface of a plastic substrate during the electrostatic spray painting process. The charges that accumulate do not dissipate as readily as with metals. This accumulation of charges reduces the potential between the spray head and the substrate, leading to weaker electrical forces on the charged paint droplets. The accumulated charges on the substrate surface also cause an opposing electrical field that repels air-borne paint particles; and the accumulated charges tend to produce a non-uniform field across the surface. These phenomena produce a self-limiting effect of yielding less paint deposition and producing less uniformity in the build-up of the paint film when compared with painting metal substrates.

In addition, some plastics have retained charges that may continue to exist for long time periods after the paint has been sprayed, making the painted surface more vulnerable to dust attraction.

As a result of these problems, it has been difficult to achieve a high quality Class "A" paint coat by electrostatic painting of plastics. The problem is particularly difficult when the objective is to apply uniform paint coats to plastic panels having complex three-dimensional shapes.

One solution to the problem has been to search for certain plastic substrate materials that will alleviate the surface charge problem and the resulting low deposition and non-uniform build-up of paint films on plastics. This approach has not proved successful to date.

Another approach has been to develop electrically conductive primers which are air-sprayed onto the plastic substrate prior to electrostatically spraying on the finished paint film. Use of a conductive primer can reduce the problems of accumulated electrostatic charges, low paint film build-up and non-uniform conductivity and film thickness. A further approach has been to add conductive materials to the molding compound, but this can degrade the physical properties of the finished part. Use of conductive polymers has also been tried, but this approach is too expensive.

In order to use such conductive primers, certain technical problems first must be overcome. There is a need for good adhesion of the primer to the plastic substrate. Special problems have been controlling the surface smoothness of the primer and achieving good adhesion to low energy substrates such as TPO (thermoplastic polyolefin) and polypropylene. The conductive primer also should have a good level of surface conductivity along with humidity insensitivity, uniformity of conductivity across the primer surface, and durability. If surface conductivity is too low, non-uniform build-up of the paint film can result. Surface conductivity, as measured in terms of "resistivity" (ohms per inch or ohms per square), should be reasonably insensitive to humidity; otherwise non-uniformities in conductivity and in the paint film build-up are produced. Other factors also can alter the uniformity of surface conductivity. When coating thickness varies as the primer is applied, it is also more difficult to achieve such uniformity.

Generally speaking, the use of conductive primers for plastic substrate panels in the automotive industry has not been successful in economically producing a Class "A" quality finish. Because of non-uniform conductivity and primer film thickness, these priming techniques have resulted in a generally poor appearance of the finished paint film. That is, a non-uniform primer, even though an undercoat in the process, can create a poor appearance of the finished exterior paint coat. It is difficult to produce a uniform paint film thickness with a primer applied by non-electrostatic air spray techniques, followed by air spraying a charged-particle paint film. Moreover, even with uniform conductivity and primer thickness, the sprayed surface can result in less than a Class "A" finish, such as an "orange peel" surface. In addition, the techniques of using conductive primers have resulted in a high scrap rate and increased production time. The current method of priming plastic parts for electrostatic paint spraying is by adding an additional step by either shipping to a separate location for priming, or priming on the paint line at the assembly plant. This amounts to high transportation and handling costs and a higher than normal scrap return rate. It also creates an additional source of volatile organic compounds. If the full car body is successfully made of plastic, the current use of a plating bath for metal parts can be eliminated from the production process.

The present invention, in one embodiment, provides a thermoformable conductive laminate that converts a non-conductive surface to a conductive surface for electrostatic painting applications. The conductive laminate overcomes the problems of non-uniform conductivity and film thickness, as well as providing a high level of conductivity uniformly across the surface of the laminate. The laminate is formed by techniques that provide a uniform conductive primer on the surface of the thermoformable laminate. The resulting laminate can be thermoformed into complex three-dimensional shapes which can then be electrostatically sprayed with a uniform paint coat after thermoforming. When used as a component in a plastic car body panel, the thermoformed laminate can be bonded to a substrate, for example, molded with thermoplastic resins, or molded with thermoset resins by various sheet molding techniques, or vacuum pressure formed and bonded to the plastic substrate. Examples of molding techniques and materials include SMC (sheet molding compound), BMC (bulk molding compound), TMC (thick molding compound), RIM (reaction injection molding), and RTM (resin transfer molding). (TMC is a trademark of Takela Chemical Industries, Ltd.) The primed part is then ready for painting directly after molding with thermoplastics or thermosets, or vacuum pressure forming. This eliminates the extra transportation and cycle time costs associated with the current off-line process of electrostatically spray painting plastic car body panels.

As a further advantage, the conductive primer retains uniformity of its conductivity throughout the thermoforming process. The primer comprises an electrically conductive uniform film with good elongation and adhesion properties. By maintaining its uniform conductivity during thermoforming, a paint coat applied to the primed conductive surface can achieve a Class "A" quality finish, even for complexly shaped panels. Less over-spray and scrap rate also are produced.

In addition to its use in the automotive industry, the invention can be used for making any contoured plastic panel in preparation for electrostatic spray painting. The thermoformable conductive laminate can be used for making doors or cabinets, or used in the electronics industry, for example, in electromagnetic shielding.

SUMMARY OF THE INVENTION

Briefly, one embodiment of this invention comprises a process for making a thermoformable conductive plastic laminate that can be used to make plastic parts adapted for electrostatic spraying or electromagnetic shielding to produce a uniform painted finish. The process includes forming a temporary flexible casting sheet, preferably release coated, more preferably matte release coated, followed by casting onto the casting sheet an electrically conductive polymeric material in thin liquid film form of uniform film thickness. The electrically conductive polymeric material or primer, in one embodiment, includes a polyester resin containing a fine particulate conductive material, such as carbon black, and an anti-blocking agent, such as a dispersion of fumed silica. The components of the formulation are controlled so that upon drying to a uniform film thickness by solvent evaporation, the surface resistivity (or conductivity) of the conductive primer film is electrostatically sprayable. A conductive primer coat which is electrostatically sprayable is in an optimal range of about 110 units or more on the Ransberg scale, or from about 5 to about 50 K-ohms/inch. The conductive primer has inherent adhesion qualities to adhere to a plastic face sheet, and under thermolaminating techniques the primer is transferred from the casting sheet to a thin, semi-flexible, thermoformable plastic face sheet by dry paint transfer laminating techniques. The resulting laminate then can be thermoformed into a complex three-dimensional shape, such as the shape of a car body panel. The carbon black and fumed silica contained in the primer accelerate the solvent release and produce a smooth coating that can produce a Class "A" quality exterior automotive paint finish when subsequently painted by electrostatic spray painting techniques. The preformed laminate can be bonded to an underlying plastic substrate material by injection cladding or thermoset molding techniques, for example, to form the finished article. The conductive primer coat has sufficient elongation and is able to maintain uniformity of conductivity throughout the thermoforming process so that the high quality finished paint coat can be produced on the outer surface of the resulting substrate. The electrical surface resistivity is retained within its desired range throughout the transfer-laminating step and the thermoforming step.

As a further advantage, the invention is useful in the electrostatic spray-painting of high temperature-resistant plastic substrate panels. These panels are commonly made by the so-called engineering plastics using thermoset molding techniques. In some instances electrostatic spray painting of these plastics in the past has experienced adhesion problems; however, the conductive primer of this invention provides good adhesion, as well as good surface conductivity, for these substrate panels.

These and other aspects of the invention will be more fully understood by referring to the following detailed description and the accompanying drawings.

BRIEF DESCRIPTION OF THE DRAWINGS

FIG. 9 is a schematic cross-sectional view illustrating a contoured plastic car body panel having an electrostatically spray painted exterior weatherable Class "A" automotive paint finish.

FIG. 10 is a schematic side elevational view showing a process for forming a conductive composite laminate comprising a conductive coating and an extruded plastic sheet.

DETAILED DESCRIPTION

Figure 1:
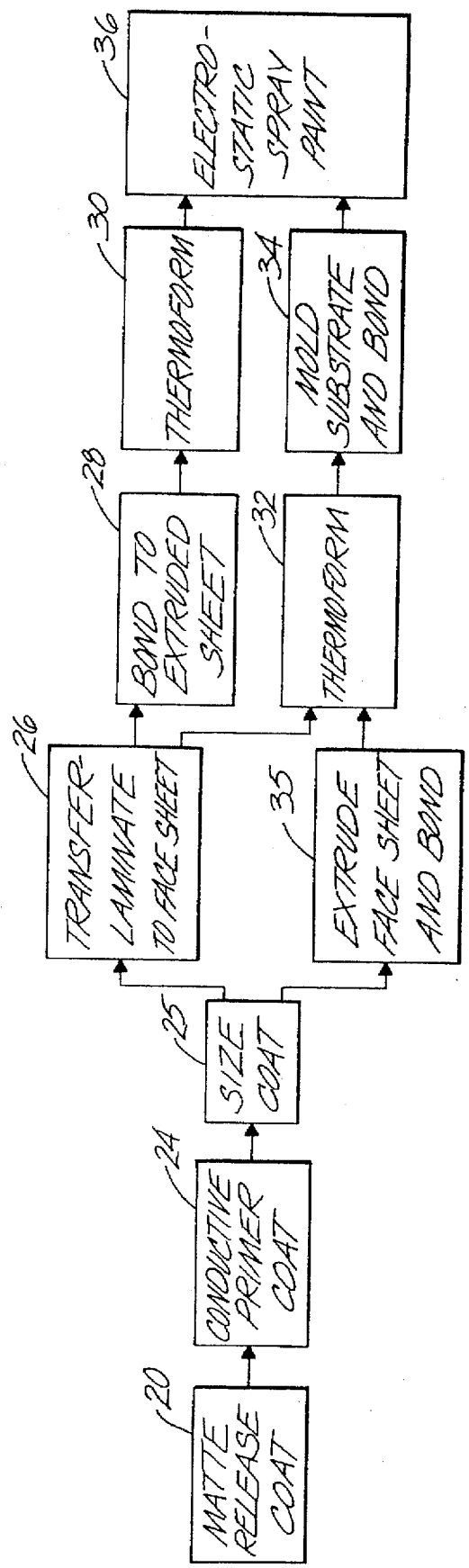
FIG. 1 is a block diagram illustrating steps in a process for making panels from a thermoformable conductive laminate according to principles of this invention.

FIG. 1 is a schematic block diagram illustrating steps in a process for electrostatically spray painting plastic panels made with a thermoformable conductive laminate according to this invention. The process is described in relation to its use in making exterior automotive body panels having an electrostatic spray painted finish, although other uses of the invention are possible as will become more apparent from the description to follow.

Figure 2:
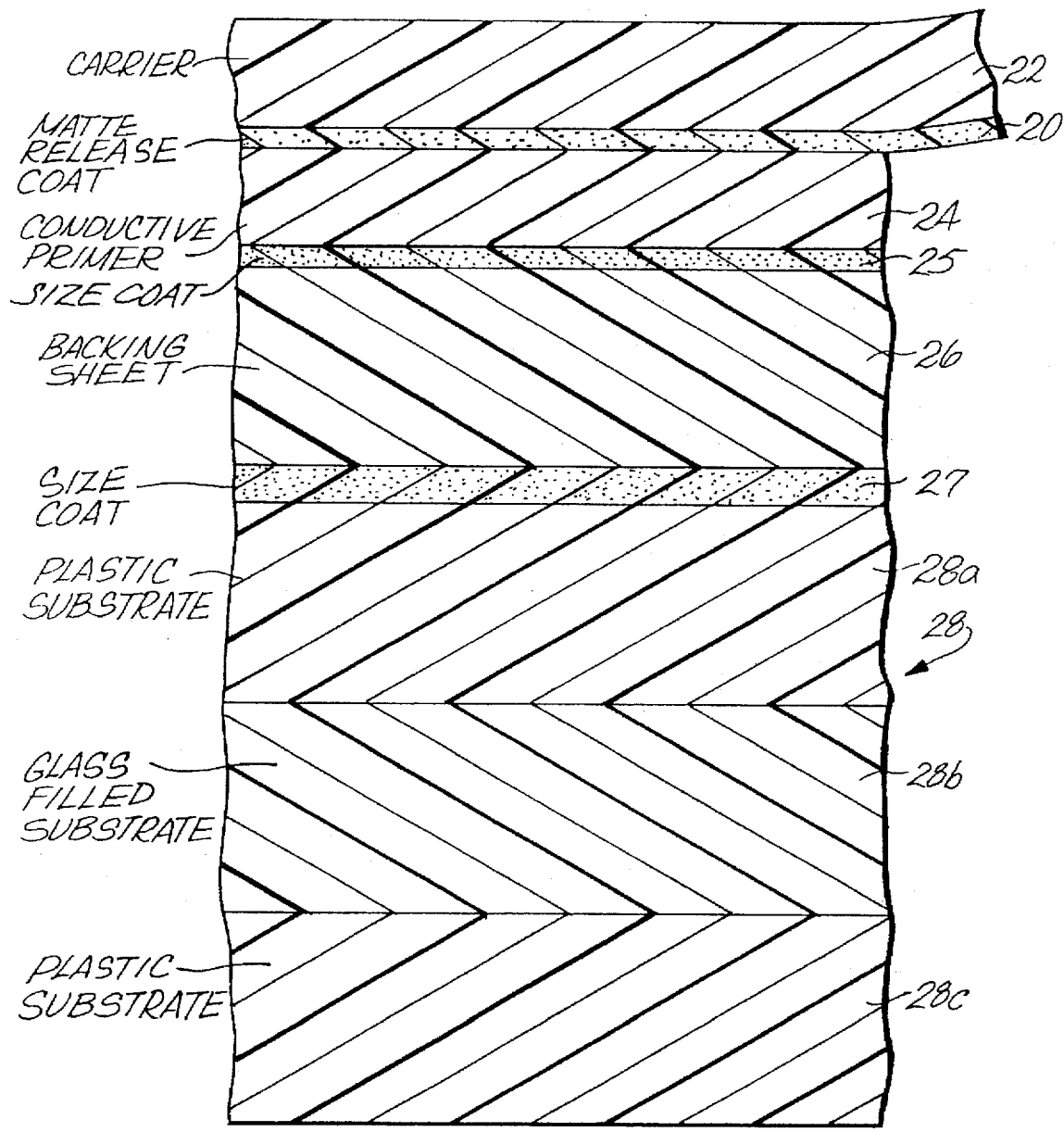
FIG. 2 is a schematic cross-sectional view illustrating one embodiment of a matte release coated carrier and conductive primer coated laminate used in a process for making electrostatically sprayable plastic panels.

Referring to FIG. 1, a paint coat with a surface capable of exterior automotive use is applied to a molded contoured plastic car body panel by electrostatic spray techniques. The process includes applying a release coat 20 to a carrier sheet 22, followed by drying the release coat on the carrier. The preferred release coat is a matte release coat because of its processing advantages described below; however, other release coats may be used. The process further includes applying an electrically conductive resinous coating of uniform film thickness to the release-coated carrier, and drying the conductive coating on the carrier to form a uniform conductive primer coat 24. An optional size coat 25 is applied to the primer, followed by drying the size coat. There are several options in bonding the conductive primer coat to a plastic substrate panel. In one option, the conductive primer coat is transfer-laminated to a thin, thermoformable plastic face sheet 26. The size coat 25 bonds the conductive primer to the face sheet. The carrier is stripped away in the transfer-laminating step to release the carrier and its matte release coat from the primer. The matte release coat remains bonded to the carrier that is stripped away. The thermoformable conductive laminate can be bonded to an extruded plastic substrate panel 28 and then thermoformed to a finished substrate in a subsequent thermoforming step 30; or the conductive laminate can be thermoformed in a thermoforming step 32 to form a thin, contoured, conductive face sheet, followed by bonding the conductive face sheet to a molded plastic substrate panel 34. The substrate panel can be formed by thermoset or thermoplastic molding, or vacuum pressure forming techniques. FIG. 2 illustrates an extruded tri-layer substrate panel having mutually bonded extruded layers 28a, 28b and 28c described in more detail below. An optional size coat 27 can be coated on the face sheet 26 to improve bonding to the substrate. Referring again to FIG. 1, the conductive primer also can be laminated directly to an extruded face sheet, in an extrusion laminating step 35. In this option, the conductive face sheet then can be thermoformed 32 and bonded to a molded substrate 34. The conductive primed laminate can be shaped into the desired highly contoured finished shape while maintaining a high level of conductivity sufficient for subsequent electrostatic spray coating of an exterior automotive paint film 36. The finished paint coat can be a weatherable, durable glossy exterior automotive paint. These include the more rigid highly cross-linked thermoset enamel, urethane or acrylic lacquers, as well as more flexible paint finishes of vinyl, or fluoropolymer resins. Of the latter type are polyvinylidene fluoride (PVDF) or PVDF-acrylic blends. The conductive primer retains uniformity of its conductivity throughout the thermoforming and substrate molding steps and facilitates forming a Class "A" exterior automotive finish electrostatically spray painted on the contoured panel surface.

FIG. 2 schematically illustrates one embodiment of the process for making the thermoformable laminate. The matte release coat 20 is coated onto the surface of a flexible, foldable, heat resistant, self-supporting carrier sheet 22, also referred to in the art as a casting film. The carrier sheet is preferably a polyester casting film such as Mylar (a trademark of Du Pont), or American Hoechst 2000 PET film. The polyester carrier film has a sufficiently high heat resistance to resist axial elongation under temperatures applied during subsequent matte release coat and primer coat drying steps.

The matte release coat 20 comprises a thermosetting resinous coating having a low gloss matting agent dispersed in it, together with a release agent which freely releases the release coated carrier from coatings applied subsequently to the carrier. Other release systems are possible at a range of gloss levels. In one embodiment the release agent includes a wax component contained in the synthetic resinous coating for enhancing release of the matte release layer, together with a silicone resin component in the coating for further enhancing release properties. In a preferred embodiment, the wax component is a polyethylene wax. The coating 20 is preferably applied by gravure coating techniques and dried in air in a drying oven at approximately 220° to 250° F. to cross-link the resin and bond the release coat to the carrier. In some instances, such as dry paint transfer laminating steps in which the primer coat is transferred to a high temperature-resistant polymer sheet such as polyarylate, the release coat (including its thermoset resin component) can be omitted.

The conductive primer coat 24 is then coated on the release coated carrier. The conductive primer preferably comprises a thermoplastic synthetic resinous material containing a sub-micron size filler such as carbon for providing electrically conductive particles uniformly dispersed throughout the resin. The preferred conductive filler is carbon black. The conductive primer is a flexible synthetic resinous dry film-form coating having electrically conductive properties described below. In some cases the conductive primer can comprise a lightly cross-linked thermosetting resin to increase the temperature resistance of the primer coat. In either case, the resinous conductive coating is flexible (or thermoplastic as defined herein) in the sense that it is thermoformable, i.e., able to be elongated under heat without cracking or degrading its conductivity. Use in an SMC process, vacuum forming contact with a heated tool, or other high temperature mold face applications can require a higher temperature resistance of the finished primer coat. The resin is dissolved in a suitable organic solvent and applied as a thin uniform film coating. The conductive coating is then dried by solvent evaporation at elevated temperatures to cure and harden the resin and form a thin, flexible, continuous uniformly conductive primer coat across the surface area of the release coated carrier. The base resin can be modified to accommodate adhesion to different plastics. In addition, other conductive materials such as graphite, nickel, copper, silver coated glass beads, nickel coated graphite fibers, and a metal flake known as Metalure (a trademark of Avery Dennison) can be added to the resinous primer base to alter conductivity as desired. A minor amount of an anti-blocking agent such as fumed silica is dispersed in the mixture. The dispersion is reduced to press viscosity with the organic solvent until a viscosity of about 1,000 cps is achieved at approximately 24% solids. A suitable organic solvent can be a 1:1 mixture of methyl-ethyl-ketone (MEK) and toluene. To assure that the lacquer meets conductivity requirements, the surface resistivity is preferably checked with both an ohm/volt meter and a Ransberg Model 236 sprayability meter. The ohm/volt meter should preferably read in the range of 5 K-ohms to 50 K-ohms/inch. The Ransberg measurement should be greater than about 110 units. The lacquer can be checked by drawing down small samples, baking them at 200° F. for four minutes to drive off the solvent, and then measuring the conductivity. Once conductivity requirements have been met, the conductive primer coat can be applied to the matte release carrier.

Figure 3:
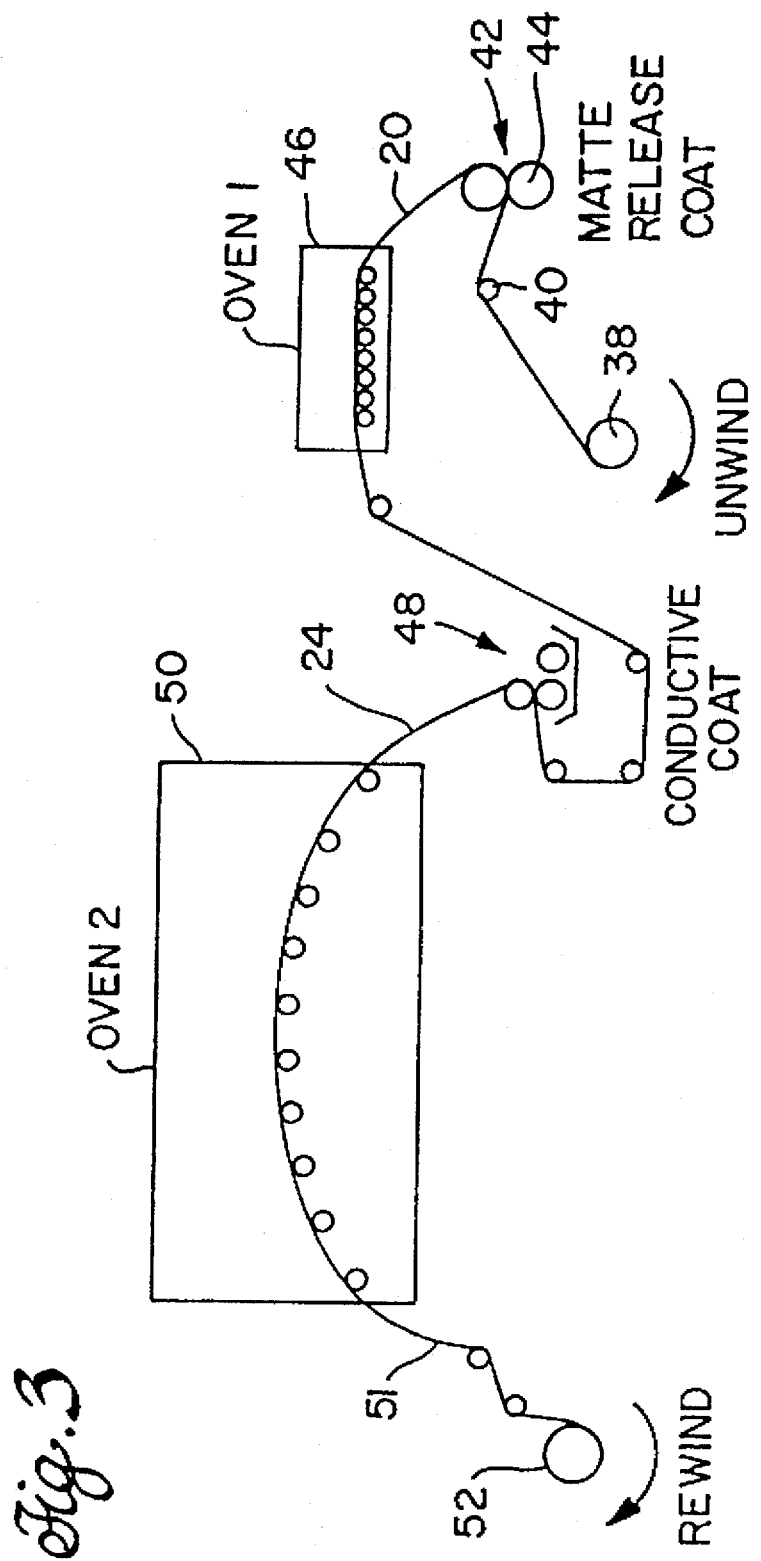
FIG. 3 is a schematic elevation view illustrating an in-line process for applying the matte release coat and the conductive primer coat.

FIG. 3 shows in more detail a first step in the process which includes coating the matte release coat in thin film form onto the surface of the temporary carrier film. The film thickness of the carrier film is less than about two mils, and is preferably about 0.48 to about 0.75 mil thick. The carrier film also has a film thickness which provides sufficient strength to permit its release from the conductive coating.

The carrier film is contained on a supply roll 38 from which the carrier is unwound, passed around an idler roller 40, and then passed to a gravure print station 42 where the matte release coat is gravure-coated onto the carrier film by a conventional gravure cylinder 44. The carrier film containing the matte release coat is then passed through a first drying oven 46, preferably a 20-foot long impinging air oven operated at a temperature from about 325° to about 350° F., sufficient for drying and cross-linking the matte release coat 20. In the first stage drying oven, the matte release coat is sufficiently cross-linked to permanently bond it to the carrier sheet. Preferably, the matte release coat is coated and dried to produce a coat weight (dry) from about 3 to about 5 gr/m$^2$.

The carrier containing the matte release coat which has been dried and cross-linked exits the first stage oven 46 and is then passed to a reverse-roll coater station 48 for coating the conductive primer coat 24 onto the dried matte release coat. The conductive primer coat is then passed to a second drying oven 50, preferably a 120-foot long impinging air oven. This oven can be in multiple stages with drying zones of different controlled temperatures, depending upon the drying characteristics of the conductive primer coat. Preferably, the cast conductive primer coat, described below, is dried at an oven air temperature of about 250°–350° F., depending on resin selection, to form an essentially solvent free (<0.3% by weight) electrostatically sprayable and electrically conductive coat on the matte release film.

The dried, conductive-coated film 51 is removed from the second drying oven 50 and wound onto a rewind roll 52 at the output of the first coating stage.

The conductive coated side of the film can be coated with the size coat 27 for use in later bonding the conductive layer to a face sheet during a transfer-lamination stage of the process. For certain lamination sheets and laminating conditions the size coat may be omitted.

The film containing the dried conductive coat passes from the second drying oven 50 to a gravure print station (not shown) where an optional size coat 25 is coated on the dried conductive coat. The size coat is then passed through an impinging air oven (not shown) operated at a temperature of about 250° F. for drying the size coat 25. The size coat is applied using a gravure cylinder and can contain a pigment up to about 25% by volume, although less than 10% by volume is preferred. The dried coat weight of the size coat ranges from about 1 to about 3 gr/m$^2$.

The size coat 25 can comprise any of various suitable coating compositions to provide adhesion of the conductive film to the face sheet 26 during the transfer-lamination step carried out later during the process. The size coat preferably comprises a suitable thermoplastic resinous material such as an acrylic resin. In one embodiment, the size coat comprises a polymethylmethacrylate or polyethylmethacrylate-containing resin.

In certain instances in which the face sheet 26 may be made from a thermoplastic polyolefin such as polypropylene or polyethylene, a different size coat can be used. In this instance, the size coat is preferably made from a coating composition of a solution of a thermoplastic chlorinated polyolefin (CPO). A preferred CPO size coat preferably is a chlorinated polypropylene or chlorinated polyethylene, in which the coating composition contains about 10% to about 60% by weight of the CPO, and correspondingly, about 40% to about 90% by weight solvent.

Figure 11:
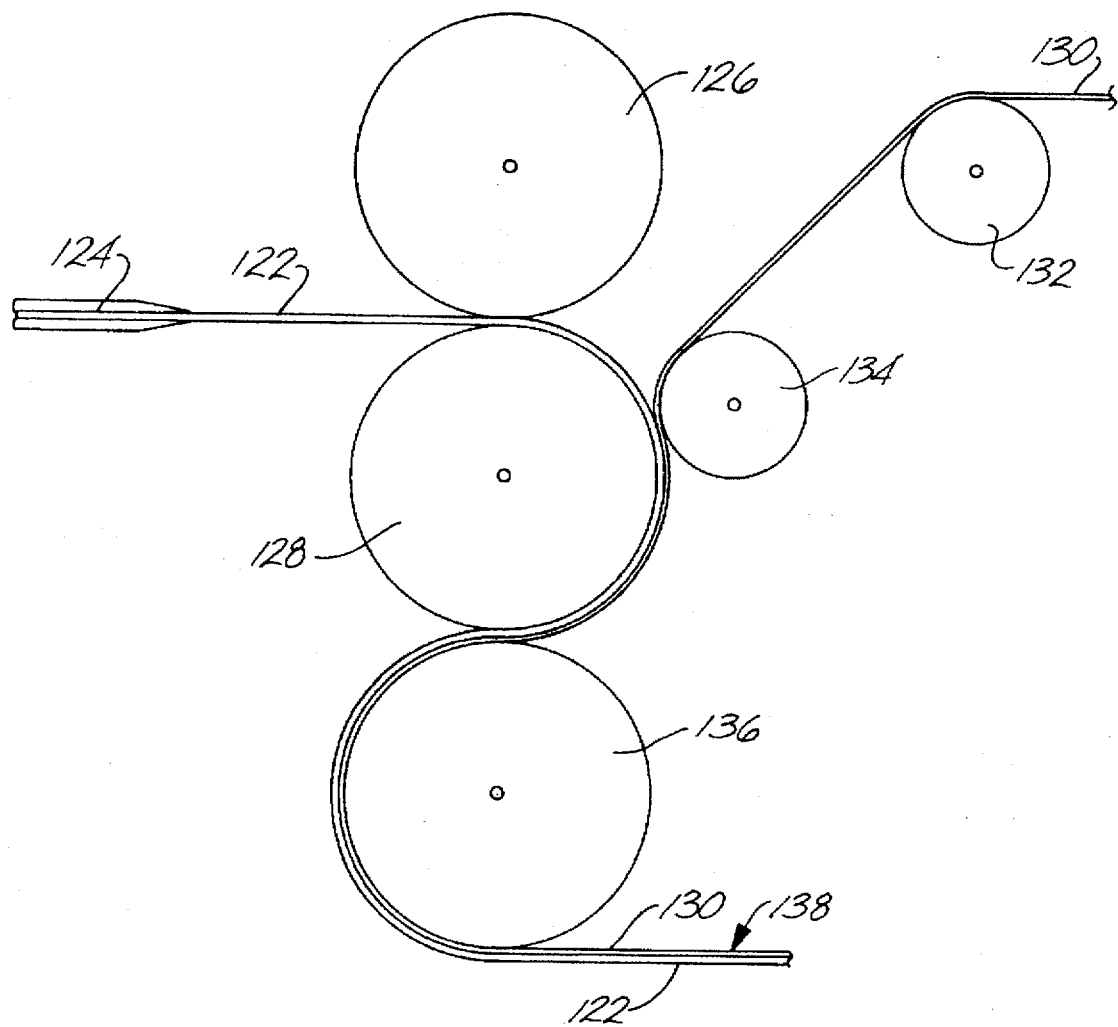
FIG. 11 is a schematic side elevational view showing a process for forming a conductive laminate comprising a conductive coating and an extruded plastic sheet.

Following drying of the size coat 25, the conductive film exits the drying oven and is wound on a supply roll (not shown). The completed foil is then removed from the coating system and installed at the unwind of a transfer-laminating station for removing the conductive primer 24 and size coat 25 from the release-coated carrier and transferring the primer to the surface of the face sheet 26. This step can be in several alternatives. An extruder-laminator can be used, in which the face sheet 26 is extruded, while simultaneously, the conductive primer film is laminated to the extruded sheet, using the heat and pressure generated from the extruder die exit and calander and transfer rolls to heat-bond the primer film to the sheet. This approach is shown in FIG. 11 and described in more detail in Example 15. When the conductive foil is pressed into contact with the extruded sheet, the extrusion temperature is also sufficiently elevated to bond the foil to the extruded sheet. The matte release coated polyester carrier sheet has a heat resistance sufficient to resist elongation or deformation during the transfer and lamination step. Following the lamination step, the flexible, laminated extruded film undergoes controlled cooling. A series of water-cooled chill rollers (not shown) produce a controlled temperature reduction in the laminate.

Alternatively, an existing primer-coated face sheet can be extrusion cap laminated to an extruded sheet as shown in FIG. 10 and described in more detail in Example 10. This technique is also shown generally in FIG. 2 in which the extruded substrate 28 is a multi-layer extrusion. In some instances, particularly those involving high temperature engineering plastics such as polyarylates in a multi-layer substrate form, adhesion is obtained without the size coats 25 or 27.

As another alternative, the conductive primer can be laminated to an existing semi-flexible plastic face sheet by a dry paint transfer-lamination step described in Example 1.

When the carrier is removed from the laminate, the matte release coat, which has been cross-linked and permanently bonded to the carrier sheet, remains adhered to the carrier film during the stripping process. The matte release coat has a matte outer surface with a micro-roughness which is transferred to the conductive primer coat. The micro-roughness of the matte coat is replicated to transfer a sufficiently low gloss to the primer coat to enhance spray paint adhesion. The desired gloss level can vary. The formulation of the matte release coat (described below) provides a combination of the desired low gloss surface, together with a smooth or free release of the carrier sheet from the low gloss surface at any stripping temperature.

The matte release coat formulation comprises a coating which can be applied to the carrier by conventional casting techniques, such as gravure or roller coating. The preferred coating composition is a thermosetting resinous material which, when exposed to heat for drying it, also cross-links and permanently bonds as a surface film adhered to the carrier sheet. The solids contained in the matte release coat preferably include, as a principal component, one or more cross-linking agents to provide good adhesion of the dried cross-linked coating to the polyester carrier film. In one embodiment, the matte release coat formulation includes a primary cross-linking resin such as a vinyl resin that bonds to the polyester film. A suitable vinyl resin is a medium molecular weight vinylchloride-vinylacetate resin known as VAGH, described in more detail in Example 1 below. This vinyl resin can be present in an amount up to about 20% of the total solids in the matte release coat. In addition, the matte release coat can include a secondary cross-linking resin to improve release of the conductive coat from the matte release coat. In one embodiment, the secondary cross-linking resin can be an acrylic modified alkyd resin such as the resin known as Chempol 13-1501 also described in more detail in Example 1. This secondary cross-linking resin comprises from about 1% to about 15% of the total solids of the matte release coat. The matte release coat further includes a suitable catalyst for accelerating the cross-linking process, typically comprising from about 1% to 2% of the total solids in the matte release coat.

The resinous components of the matte release coat composition are mixed with suitable organic solvents. In one embodiment, the resins are mixed with a primary resin solvent such as methyl isobutyl ketone (MIBK) which comprises about 80% to about 95% of the total solvent in the formulation. A secondary resin solvent such as isopropyl alcohol (IPOH) is useful in retarding cross-linking of the resins in solution. The secondary resin solvent preferably comprises from about 5% to about 20% of the total of solvent.

The matte release coat formulation is prepared by dissolving the primary cross-linking resin in the primary and secondary resin solvents by mixing and then adding the secondary cross-linking resin, together with a primary matting agent, preferably in the form of a filler comprising a fine particulate inert inorganic material. In one embodiment, the filler comprises aluminum silicate with an average particle size of about 5.0 microns. The filler contained in the formulation comprises up to about 25% of the total solids in the matte release coat. The fine particulate filler is thoroughly dispersed in the resin and resin solvent blend, preferably under elevated temperatures from about 100° to about 120° F.

When the matte release layer dries and cross-links, it forms a matte coating on the surface of the carrier sheet. The thermoset resinous coating is continuous with the face of the carrier sheet, and in its cross-linked and permanently bonded dry film form, it provides a high temperature resistant thermal transfer barrier between the polyester carrier sheet and the primer coat and its underlying substrate. The matte surface is controlled by the amount and particle size of the filler. The fine particles in the matte release coat form, on a microscopic scale, a surface with a micro-roughness that transfers a replicated micro-roughness to the surface of the dried conductive coat.

The matte release coat formulation may include a release agent to enhance freely releasing the carrier and its matte release coat from the conductive coat during the transfer process. The release agent preferably includes a wax component such as a polyethylene wax which melts at elevated temperatures to allow easy hot release of the release coat. The wax component is normally suspended in the matte release coat at 100°–120° F.; and the wax component, in its suspended or particulate form, also acts as a matte agent. The preferred polyethylene wax is Shamrock S-381-N1 (described in Example 1 below). In one preferred form of the release coat formulation, the polyethylene wax comprises from about 0.1% to about 25% of the solids contained in the matte release coat.

The release agent contained in the matte release coat formulation may further include a silicone resin component which combines with the polyethylene wax to enhance free release of the conductive coat from the matte release coat at temperatures ranging from room temperature to elevated.

In one embodiment, the silicone resin comprises from about 0.5% to about 25% of the solids contained in the matte release coat formulation. Release is improved when the wax and silicone resin are used in combination in the matte release coat.

In one embodiment, the conductive primer coat is a thermoplastic synthetic resinous coating composition. The preferred dry film thickness of the conductive coat is from about 0.3 to about 1.5 mils. Preferably, the conductive primer coat lacquer formulation produces a dry film coating having desired properties of electrical conductivity, resistance to spray paint solvents, and adhesion to sprayed paints and primers, resulting in a Class "A" surface after electrostatic paint spraying. The electrically conductive polymeric material, in one embodiment, includes a polyester resin containing a fine particulate conductive material, such as carbon black, and an anti-blocking agent, such as a dispersion of fumed silica. Other thermoplastic resinous materials can be used such as acrylics, polyurethanes, polyarylates, polycarbonates, and polyetherimides.

In one embodiment, a principal component of the resin contained in the conductive primer coat is a polyester resin, such as Adcote X80-125 (a trademark of Morton International of Chicago, Ill.). In its preferred form, the polyester component comprises from about 50% to about 90% of the total solids contained in the conductive coat formulation, preferably from about 70% to 85%. The lower limit is governed by the cohesive strength of the dried film and the upper limit is governed by the conductivity required. In one embodiment, the conductive coating is lightly cross-linked, as mentioned previously, to increase the temperature resistance of the finished primer, as described below in Example 15.

A second component is a conductive pigment, preferably a carbon black, and most preferably Vulcan XC-72 a trademark of Cabot Corp. In its preferred form the carbon black comprises from about 10% to about 50% by weight of the solids contained in the conductive primer. The lower limit is governed by the surface conductivity of the finished dried conductive primer film which will allow electrostatic painting.

The third, and optional, component is a particulate anti-blocking agent, preferably a fumed silica, most preferably the material sold under the designation TS-100, a trademark of DeGussa. In its preferred form, the fumed silica comprises from 0% to about 5% by weight, most preferably 2% to 3% by weight, of the total solids in the conductive primer. Too much antiblocking agent reduces the conductivity of the finished, dried conductive primer film.

A preferred formulation contains 27 parts Adcote X80-125 polyester resin (dry), solvents MEK and toluene 32.6 parts each, 6.8 parts Vulcan XC-72 carbon black, and one part TS-100 fumed silica.

Other minor components of the conductive coat formulation may include a dispersing agent, such as the material sold under the designation FC-430, a trademark of 3M Co. The dispersing agent preferably comprises up to about 0.05 parts per 100 parts resin.

EXAMPLE 1

A plastic car body panel was made by the following steps: (a) preparing a matte release film; (b) preparing a conductive primer film; (c) preparing a conductive transfer foil; (d) transfer to a thermoformable backing sheet; (e) thermoforming; and (f) bonding of the thermoformed laminate to a substrate panel.

a. Matte Release Coat

A matte release coat was formulated from the following components:

|  | Component | Parts |
|---|---|---|
| Composition 1: | Methyl isobutyl ketone (MIBK) | 42.4 |
|  | Isopropyl alcohol (IPOH) | 7.8 |
|  | VAGH | 10.2 |
|  | ASP400 | 26.3 |
|  | Chempol 13-1501 | 12.7 |
|  | S381-N1 | 0.6 |
|  |  | 100.0 |
| Composition 2: | Methyl isobutyl ketone | 56.7 |
|  | Isopropyl alcohol | 9.0 |
|  | VAGH | 15.1 |
|  | Chempol 13-1501 | 19.2 |
|  |  | 100.0 |
| Release Coat: | Composition 1 | 25.35 |
|  | Composition 2 | 54.83 |
|  | SR107 | 0.86 |
|  | MIBK/IPOH Blend (85/25) | 7.56 |
|  | Cycat 4040 | 4.2 |
|  | Cymel 303 | 7.2 |
|  |  | 100.00 |

1. VAGH is a medium molecular weight, partially hydrolyzed vinyl chloride-vinyl acetate resin (approximately 90% vinyl chloride, 4% vinyl acetate and a hydroxyl content of 2.3%) sold by Union Carbide, Somerset, N.J.

2. ASP400 is an aluminum silicate of average particle size five microns made by Engelhard Corp., Edison, N.J., and sold by Jensen-Souder, Itasca, Ill.

3. Chempol 13-1501 is an acrylic modified alkyd resin solution (50% resin, 50% xylol) sold by Freeman Chemical Co., Port Washington, Wis.

4. SR-107 is a silicone resin manufactured by General Electric, Waterford, Connecticut, and sold by Fitzchem, Chicago, Ill.

5. S381-N1 is a polyethylene wax sold by Shamrock Chemicals Corp., Newark, N.J.

6. Cycat 4040 is a para toluene sulfonic acid catalyst (40% by weight in isopropanol) sold by American Cyanamid Co., Walingford, Conn.

7. Cymel 303 is a liquid hexamethoxy-methylmelamine cross-linking agent sold by American Cyanamid.

Composition 1 was produced by dissolving the VAGH resin in an MIBK and IPOH blend by mixing in a Cowles mixer and then adding the Chempol 13-1501, ASP400 and the S381-NI while mixing. This mixture was then sand-milled at a temperature of about 110° F. to disperse the ASP400.

b. Conductive Primer Coat

A conductive primer coat was formulated as follows. 16.5 parts of methyl ethyl ketone (MEK) and 16.5 parts of toluene were mixed in a vessel. 58 parts of the polyester resin solution were slowly added while mixing. After the mixture was homogeneous, 9 parts of Vulcan XC-72 carbon black were slowly added. This premix was then milled to a grind of less than 5 microns in a shot mill (1 mm shot). Any solvent loss during milling was brought back to its original weight, and the batch was labeled Batch A. 96 parts of the polyester resin solution were added into a separate vessel and mixed while slowly adding 4 parts fumed silica. The mixture was dispersed to a grind of 30 microns and labeled Batch B. Three parts Batch A and one part Batch B were mixed until a homogeneous state was achieved.

8. The polyester resin solution comprised Adcote X80-125 which was at 40% solids in a 50:50 blend of MEK and toluene.

9. Vulcan XC-72 is a high surface area conductive carbon black of average particle size of 30 nm sold by Cabot Corp. of Waltman, Mass.

10. The fumed silica was TS-100 with an average particle size of 5 microns, sold by Degussa Corporation of Teterboro, N.J.

c. Preparation of the Conductive Transfer Foil

The matte release coat was gravure coated in uniform film thickness onto the carrier with a 100 HK gravure cylinder pattern at a coat weight (dried) of 3 gr/m$^2$. The carrier was 75 gauge oriented gloss polyester carrier sheet (Hostaphan 2000, sold by Hoechst Celanese, Greer, S.C.). Line speed was 200 feet per minute and the coating was dried and cross-linked in a 20 foot impinging-air oven (Oven No. 1 in FIG. 3) at an air temperature of 340° F. (web temperature approximately 220° F.). This formed a continuous, uniform high temperature resistant matte release film permanently bonded to the carrier sheet.

Next, the conductive primer coat was coated at a coating weight (dried) of 22 gr/m$^2$ onto the dried matte release coat in a reverse-roll coater station on the same coater. The primer coat was of continuous, uniform film thickness and was dried and fused in a 120 foot three-zone impinging air oven with the air temperatures in the three zones being 200° F., 230° F., and 250° F. This formed a dried conductive primer coat on the matte release coat of the carrier film.

To minimize web shrinkage and avoid distortion of the carrier film, web tension was maintained below 0.8 lbs/linear inch of web width through the drying ovens.

The dried, coated primer film was wound as a roll, and removed from the coater.

d. Transfer to Thermoformable Backing Sheet

Figure 4:
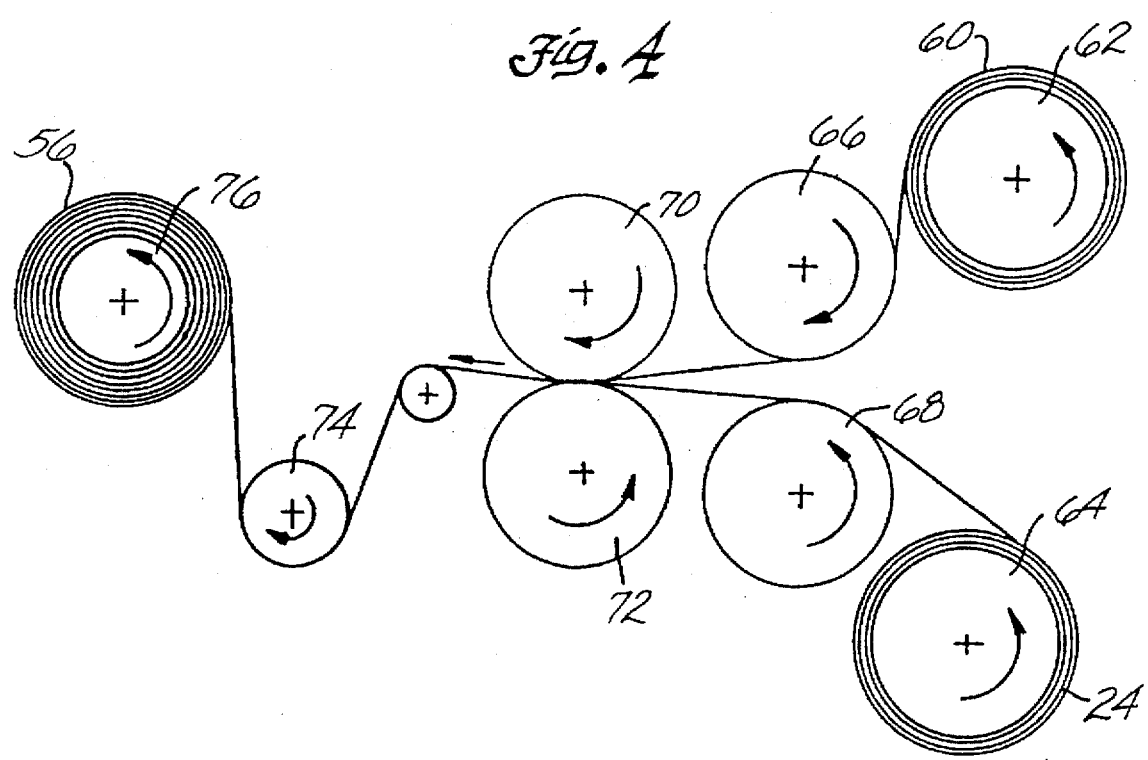
FIG. 4 is a schematic elevation view illustrating a transfer-laminating step of the process.

The conductive primer-coated carrier was next laminated to the thermoformable face sheet 26 by dry paint transfer-laminating techniques illustrated in FIG. 4. The thermoformable laminate 56 formed by the transfer-lamination step includes the composite conductive primer layer 24 adhered to the face sheet 26. The face sheet is preferably a semirigid, self-supporting, thin, flat sheet of a synthetic resinous material. The face sheet is made from a material which is compatible with an injection-molded plastic material or thermosetting fiber filled molding compound later used to form the structural substrate base 28 of the finished article, or the face sheet is compatible with another polymeric laminate to which it is adhered when the total structure is vacuum pressure formed as an alternative technique for forming the finished panel. Preferably, the face sheet is made from the same or substantially the same polymeric material as the substrate base of the finished article. The face sheet also is made from a material having a thickness capable of thermoforming into a complex three-dimensional shape, along with the adhered composite conductive primer coat, without substantially affecting the conductivity of the conductive primer. The material from which the substrate is molded can contain a substantial amount of large fibers or particulate filler and therefore can produce an imperfect surface on the final painted article molded from the substrate material. The laminate is adhered to the otherwise imperfect surface of the molded substrate to improve the surface characteristics of the substrate panel and produce a uniform conductive primer which, when electrostatic spray painted with an exterior automotive paint, produces an outstandingly smooth controlled exterior Class "A" automotive finish. The properties of a Class "A" exterior automotive paint surface are described generally in PCT Application No. WO 88/07416, incorporated herein by this reference. The multi-layered article in its finished form comprises a high-performance, essentially defect-free, three-dimensionally shaped paint coat with exterior automotive properties in combination with the backing sheet, which provides a buffer layer between the substandard surface of the substrate and the finished paint coat. The face sheet material minimizes the surface imperfections transmitted to the paint coat. The preferred materials from which the face sheet is made are ABS (acrylonitrile-butadiene-styrene), polycarbonate, a polyester known as Xenoy (a trademark of G.E.), a polyetherimide known as Ultem (a trademark of G.E.), a modified phenylene oxide known as Noryl (a trademark of G.E.), polyarylate, TPO, nylon, vinyl (PVC), and GTX urethane acrylic polycarbonate. A preferred ABS material is Borg Warner's Cycolac L.S. Thermoplastic polyolefins (TPO's) including polypropylenes and polyethylenes may be used, as well as polyesters or an amorphous nylon, such as Bexloy C-712, a trademark of Du Pont.

The thickness of the face sheet can vary, but generally it is necessary for the face sheet to have a sufficient thickness to isolate or absorb imperfections in the surface of the underlying substrate while presenting a smooth upper surface of the paint coat after painting. A desirable range of thickness of the face sheet is believed to be from about 10 to 200 mils, with 20 mils being a preferred thickness for an ABS sheet when used in thermoset or thermoplastic molding, for example. The thicker laminates are preferred for VPF (vacuum pressure forming) operations.

The laminating step illustrated in FIG. 4 shows the conductive-coated carrier 60 stored on a top unwind roll 62 and a flexible 20 mil thick ABS face sheet 24 stored on a bottom unwind roll 64. The conductive-coated carrier, in one embodiment, comprises the conductive primer coat on a single flexible matte release-coated casting sheet. The conductive-coated casting sheet 60 is passed around a drum 66, and the face sheet passes around a drum 68. The carrier and backing sheet then pass between a heated laminating drum 70 and a rubber backup roll 72. The laminating drum is preferably made of steel and is preferably operated at a temperature of about 400° to 425° F. It is pressed into contact with the overlapping sheets to heat them to a temperature sufficient to melt the release agents in the matte release coat to release the primer from the carrier and to bond the conductive primer coat to the face sheet. The rubber backup roll 72 and laminating drum 70 are in pressure contact with the carrier and backing sheet preferably at a pressure of about 300 pounds per lineal inch. The speed at which the sheets travel during laminating ensures that the resulting laminate is heated to a temperature necessary to effect transfer and bonding. The heat softens the face sheet material somewhat to ensure a complete bond between the conductive coat and the face sheet. The polyester carrier sheet of the conductive matte release-coated carrier has a heat-resistance above laminating temperatures so the carrier sheet resists elongation during the laminating step. During the transfer step the micro-roughness of the matte surface on the carrier is transferred to the surface of the primer coat. Following the bonding step, the flexible conductive-coated laminate is then passed around one or more chill rollers 74 for cooling the laminate to room temperature. The finished laminate 56 then passes onto a laminate rewind drum 76. The carrier sheet may be stripped away from the laminate prior to the subsequent thermoforming step or may remain attached. Other polymeric films or laminates may also be similarly transfer-laminated to the finished conductive laminate.

e. Thermoforming

Figure 5:
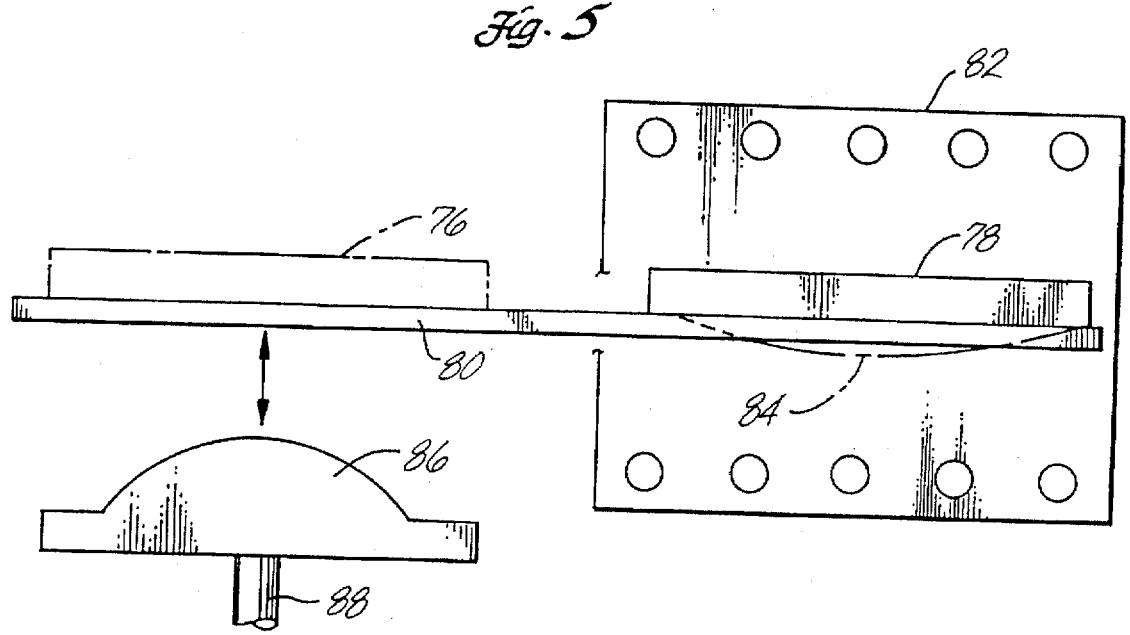
FIG. 5 is a schematic view illustrating a thermoforming step of the process in which a paint coated laminate is heated prior to vacuum forming.
Figure 6:
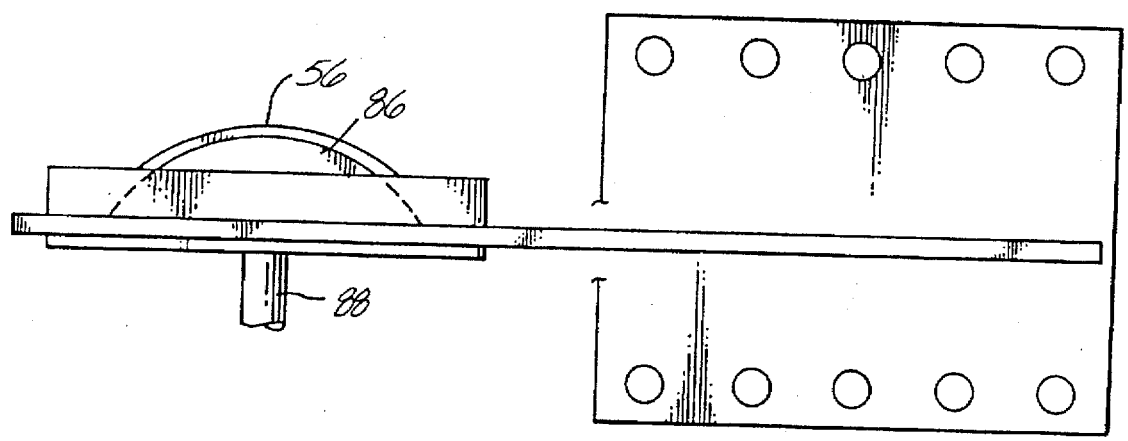
FIG. 6 is a schematic view illustrating another thermoforming step in the process.

In the next step in the process, the laminate 56 shown in FIG. 4 was thermoformed into a desired three-dimensional shape. The thermoforming step is illustrated in FIGS. 5 and 6 in which the initially flat laminate is formed into a highly contoured three-dimensional shape for use as the surface of a car body panel. Separate laminate sheets are individually placed inside a clamping frame 78 of a vacuum-forming machine. The clamping frame is movable back and forth on a track 80. The laminate sheet is initially placed in the clamping frame at the position shown in FIG. 5.

The clamping frame is then moved along the track into an oven 82 for heating the back sheet to a thermoforming temperature. The ABS face sheet is heated to a temperature in the range of about 280° to about 380° F. For a Bexloy nylon the sheet is heated to a temperature from about 380° to about 420° F. These temperatures are actual sheet temperatures, not oven temperatures. A pressure assist can be used with the thermoforming step in order to reduce the thermoforming temperature. At thermoforming temperatures the laminate sags as shown at phantom lines at 84.

After the laminate is heated in the oven to the desired temperature, the clamping frame is moved back along the track 80, away from the oven 82 and to its original position above a vacuum-forming buck 86. The working surface of the vacuum-forming buck 86 is shown as a curved surface, by way of example only. Other configurations can be used depending upon the desired three-dimensional shape imparted to the surface of the finished article.

The preheated laminate is next vacuum-formed into the desired three-dimensional shape by first drawing a vacuum on the vacuum-forming buck through its connection to a vacuum pump 88. The vacuum-forming buck is then raised to the position shown in FIG. 6, where it has risen into the clamping frame. The vacuum is pulled through holes in the buck to force the hot plastic into the shape of the working surface of the buck. Positive air pressure can be applied to the free face of the primer coat on the opposite side of the buck to increase forming pressure. The buck stays in place long enough to cool the plastic to a solid state again before the buck drops away back to the position shown. This leaves behind the plastic in the shape of the buck. The preferred vacuum-forming step is to use a male vacuum former in which the vacuum-forming buck is in direct contact with the face sheet so as to not contact the exterior conductive coat on the opposite side of the backing sheet. In this way, the face sheet hides most of any of the possible defects in the working surface of the buck; and the surface of the conductive coat is not affected, but is allowed to elongate freely. Female molds can also be used successfully.

In an alternate thermoforming step (not shown), the laminate can be fed to the thermoformer as a continuous sheet. The laminate first passes through the oven and then passes to the thermoforming buck in line with the downstream end of the oven. The continuous sheet is stopped at preset intervals for heating the laminate to the thermoforming temperature while a previously heated portion of the sheet is vacuum formed into the desired shape.

Figure 7:
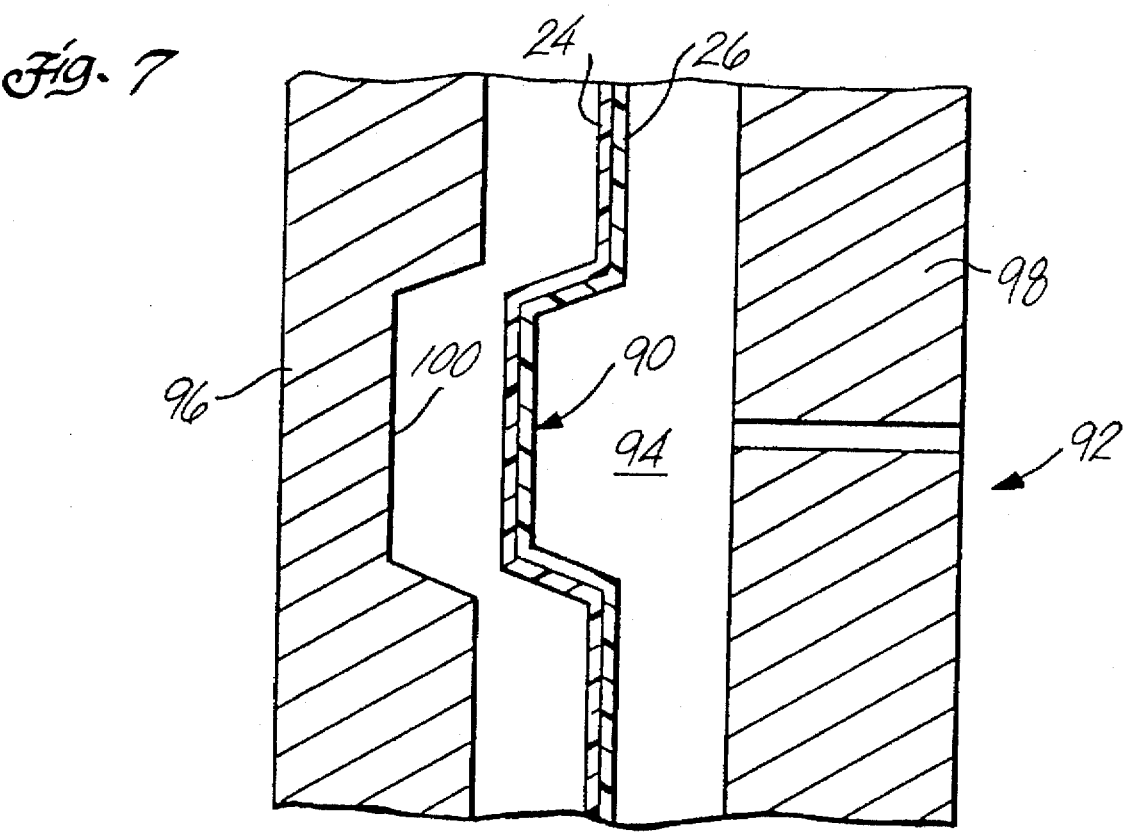
FIG. 7 is a schematic cross-sectional view illustrating a preliminary step in an injection-cladding step of the process.

The thermoforming step produces a three-dimensionally shaped preformed laminate shown at 90 in FIG. 7. For simplicity, the preformed laminate is illustrated as comprising the face sheet 26 and the conductive primer coat 24 adhered to it. The laminate is illustrated in a three-dimensionally shaped form following the thermoforming step as one example only of a possible three-dimensional shape. Other complex three-dimensional shapes are also possible. The conductive coating experiences elongations greater than about 150% during thermoforming without significantly affecting the uniformity of conductivity and the ability to electrostatically spray paint it to achieve a Class "A" surface.

(f) Bonding of Thermoformed Laminate to Substrate Panel

Figure 8:
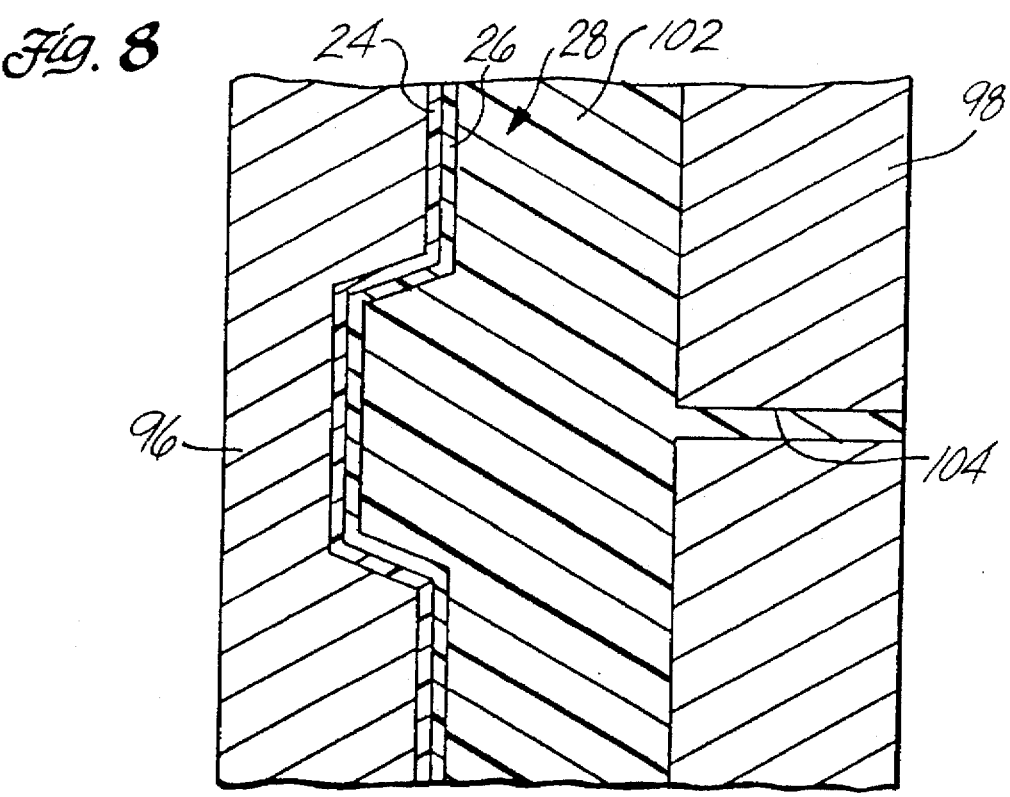
FIG. 8 is a schematic cross-sectional view illustrating a substrate material injection molded behind the thermoformed laminate in an injection mold.

A subsequent injection-cladding operation is shown in FIGS. 7 and 8 in which the preformed laminate 90 is adhered to an underlying plastic substrate panel 28. The injection-cladding step is an example of a possible means for adhering the laminate to the substrate. After the laminate 90 is preformed to its desired shape, it is trimmed to size and is ready for injection-cladding. The thermoformed laminate 90 is placed in an injection mold 92 and fused to the face of an injection-molded substrate. According to a first step in the injection-cladding step, a plastic injection mold is in its open position, and the preformed laminate is placed in a mold cavity 94 between front and rear mold halves 96 and 98. The inside surface 100 of the mold half identically matches the exterior contour of the conductive primer-coated surface of the preformed laminate 90. This surface of the mold is a rigid surface which is free of surface defects so that surface defects are not transferred to the conductive-coated surface of the laminate. After the vacuum-formed die cut sheet 90 is placed inside the injection mold, a space is left behind the laminate for receiving the injection molding material 102. The injection molding material flows through a passage 104 in the rear mold half and into the mold cavity behind the preformed laminate. The molding material conforms to the shape of the mold cavity and is permanently fused to the face sheet portion of the laminate. The injection molding material does not come into contact with the conductive coat. As described previously, the molding materials from which the substrate and the face sheet are made are compatible so that the two materials fuse to form an integral molded substrate on which the conductive coat provides a defect-free finish. The temperature at which the injection-mold is operated is substantially below the melt temperature of the molding material. In one embodiment, in which an ABS backing sheet was used, the molten material was at a temperature of about 450° F., for example. A water jacket can be used to cool the faces of the mold. Both faces of the mold are cooled to a temperature in the range of about 160° to 170° F., so that the conductive primer coat on the laminate remains stable during injection molding. A lightly cross-linked or more temperature-resistant resin can be used at higher mold temperatures.

The finished article produced by the process of this invention includes the preformed laminate 90 and its face sheet 26 which have been fused to the molded substrate.

In one embodiment, the article can be a conductive primed exterior car body member or panel. Any defects in the substrate material have been absorbed by the 20 mil thick face sheet to provide a defect-free conductive coat 22.

Although this example has been described with respect to the illustrated thermoplastic injection-molding steps, other techniques can be used for forming the finished article. These include, but are not limited to, fiber reinforced thermoset injection molding (TMC), use of sheet molding compounds (SMC), compression cladding and reaction injection molding (RIM) and resin transfer molding (RTM) techniques, vacuum pressure forming, and pressure-sensitive or adhesive bonding techniques. Other plastic molding materials also can be used in place of ABS for fusing the substrate panel to the primer-coated face sheet. These may include thermoplastic polyolefins (TPO's) such as polypropylenes and polyethylenes; polyesters; and amorphous nylon. In these instances, the face sheet is preferably made from the same polymeric material as the injection molding material.

EXAMPLE 2

The conductive coating in the polyester resin system from Example 1 was coated as a uniform film 0.8 mils thick on the matte release coated polyester film in Example 1 and then laminated to a 20 mil thick ABS face sheet.

The following table shows resistivity measurements in Ransberg units, K-ohms/in., and K-ohms/sq.

| Film Thickness | Ransberg | K-ohms/in. | K-ohms/sq. |
| --- | --- | --- | --- |
| 0.8 mils | 165+ | 37 | 26 |

EXAMPLE 3

The conductive coating in the polyester resin system from Example 1 was coated as a film 0.5 mil thick on the matte release coated polyester film in Example 1 and then laminated to a 20 mil thick ABS backing sheet.

The following table shows resistivity measurements in Ransberg units, K-ohms/in., and K-ohms/sq.

| Film Thickness | Ransberg | K-ohms/in. | K-ohms/sq. |
| --- | --- | --- | --- |
| 0.5 mils | 165+ | 45 | 32 |

In both Examples 2 and 3, the coating resulted in a surface that is electrostatically sprayable. To be considered electrostatically sprayable a Ransberg reading greater than about 110 units is required.

The most practical method to determine electrostatic sprayability is with the Ransberg 236 sprayability meter. Two conductive probes that are one inch apart contact the surface under test. The measurement is activated by depressing a button on the hand-held gauge and an electrical charge is passed from one probe to the other. The reading is recorded in Ransberg units. Any reading below 110 units is considered a surface that is not electrostatic sprayable.

Another method for calculating the surface resistivity is by the use of a Micronta 22-201U ohm/volt meter. The preferred method is by point to point readings recorded by fixing the distance of the point probes at exactly one inch apart, contacting the test surface with the probes, and recording the resistivity in K-ohms/inch. The most preferred method is by fixing two one-inch by ⅛-inch copper bars on a 1¼ inch square block of non-conductive plastic such as plexiglass. The bars are parallel, one inch apart. The copper bars serve as contact points for the surface to be measured. Each bar is wired into the ohm/volt meter and a 500 gram weight is placed on the top of the plexiglass before the reading is recorded in K-ohms/square.

EXAMPLE 4

A series of conductive coatings were formulated at different carbon black pigment to polyester resin ratios. The conductive coatings were applied to a matte release liner as described in Example 1 and laminated to a 20 mil thick ABS sheet. The conductive film thickness was 0.8 mils. The carbon black was Vulcan XC-72. The following table shows surface resistivity measurements as a function of pigment/binder (or resin) ratios. The ratio is determined on the basis of a dry film resin.

| P/B Ratio | Ransberg | K-ohms/in | E.S. Sprayable |
|---|---|---|---|
| 0.2308 | +165 | 25 | Yes |
| 0.2129 | +165 | 46 | Yes |
| 0.1953 | +165 | 97 | Yes |
| 0.1778 | 164 | 378 | Yes |
| 0.1606 | 147 | 500 | Yes |
| 0.1416 | 140 | 500 | Yes |
| 0.1211 | 131 | 500+ | Yes |
| 0.0895 | 87 | 500+ | No |

EXAMPLE 5

Standard Cabot Vulcan XC-72 carbon black having a surface area of 254 $M^2$/gm was compared to two other Cabot lower surface area carbon blacks. Mongul L having a surface areas of 138 $M^2$/gm and Vulcan PA-74 having a surface area of 140 $M^2$/gm were formulated at 7 parts carbon black per 30 parts polyester resin. The formulas were milled with 1/8 inch shot on a lab scale paint shaker for three hours. The coatings were applied to the matte release liner as described in Example 1 at a thickness of 0.8 mils.

The following results represent carbon black type vs Ransberg units measurements:

| Carbon Type | Ransberg | E.S. Sprayable |
|---|---|---|
| Mongul L | 81 | No |
| Vulcan XC-72 | 165+ | Yes |
| Vulcan PA-74 | 82 | No |

It was concluded that carbon black having a surface area greater than about 200 $m^2$/gm would produce the highest and most consistent conductivity.

EXAMPLE 6

Conductive materials other than carbon black were formulated. U.S. Bronze Powder Palegold B620 and Potter Labs ESD fiber batch 91-100-4.6.7 were substituted in the polyester resin of Example 1 at a concentration of 30% by weight (dry). After the mixture was homogeneous, the solutions were coated at a film thickness of 0.8 mil. The following results show material type compared with Ransberg units of conductivity:

| Material Type | Ransberg | E.S. Sprayable |
|---|---|---|
| Bronze Powder | 80 | No |
| ESD Fiber | 82 | No |

EXAMPLE 7

Samples of the conductive coating of Example 1 with U.S. Bronze Powder Palegold B620 added at 50% and 67% by weight levels in place of the carbon black were applied to matte release liner as described in Example 1 at a film thickness of 0.8 mils and laminated to a 20 mil thick ABS sheet. Similar samples were made with no conductive filler, with carbon black as the conductive filler, and with Metalure as the conductive filler. The Metalure material was Avery Dennison product no. L-55350. The samples were measured for EMI/RF shielding properties with a Bekiscan CP2 instrument. The Bekiscan CP2 microwave reflection analyzer is a non-destructive method of testing EMI/RF shielding effectiveness for plastic parts. Good commercial products have reflection measurements in a range above about 70%. The following table shows the test results:

| Sample | Shielding At 10 Ghz | K-ohms/sq. |
|---|---|---|
| ABS Only | 0% Refl. | >$10^{12}$ |
| Conductive Coat with carbon black on ABS | 0% Refl. | 10.0 |
| Conductive Coat with 50% by weight bronze powder | 48% Refl. | 0.21 |
| Conductive Coat with 67% by weight bronze powder | 71% Refl. | 0.12 |
| Conductive coat with Metalure at 30% by weight | 90% Refl. | N.A. |

Good results were obtained with the greater sized Metalure flakes which are high aspect ratio vacuum metallized aluminum flakes with an average major dimension of about ten microns.

EXAMPLE 8

The conductive laminate of Example 1 was formed on a 20 mil thick ABS sheet. The laminate was vacuum formed (on a Packaging Industries continuous feed vacuum former) into a vacuum formed shell. The shell was injection molded with ABS in an injection molding machine. The resulting substrate was shaped as a finished door trim panel. The following table lists the resistivity measurements on the surface of the finished part:

| Part | Ransberg | K-ohms/in. | K-ohms/sq. | Sprayable |
|---|---|---|---|---|
| Trim | 165+ | 10.3 | 7.1 | Yes |

EXAMPLE 9

A conductive coating as described in Example 1 was applied to a matte release liner as described in Example 1 and laminated to a 20 mil thick ABS sheet and a 20 mil thick Ultem sheet. Each construction was vacuum formed with a three-step tool that simulated three different depths of draw or elongation. The following table shows surface resistivity measurements as a function of depth of draw or final film thickness of the conductive coating:

| Depth of Draw | Film Thickness | Ransberg | K-ohms/in. | E.S. Sprayable |
|---|---|---|---|---|
| ABS 20 Mil | | | | |
| Lo | 0.8 mil | 165+ | 35 | Yes |
| Med | 0.6 mil | 165+ | 38 | Yes |
| Hi | 0.5 mil | 165+ | 45 | Yes |
| Ultem 20 Mil | | | | |
| Lo | 0.8 mil | 165+ | 35 | Yes |
| Med | 0.6 mil | 165+ | 45 | Yes |
| Hi | 0.4 mil | 165+ | 55 | Yes |

After recording data, the conductive coated vacuum formed laminate was electrostatically spray painted. The paint used was received directly from the GM assembly paint line at the Cadillac assembly plant in Lake Orion, Mich. The following table lists the individual paints:

| Paint | Identification | Film Thickness |
|---|---|---|
| Grey Prime | PPG Code 13 Prime 1146-9855 Lot 19563 | 1.2 mils |
| Base Coat | PPG Code 22 Blue Met 8966 Lot 17733 | 0.9 mils |
| Urethane Clear Coat | Part A - PPG NCT 2BR Lot 19261 | 1.9 mils |
| Urethane Clear Coat | Part B - PPG NCT 2AV Lot 18423 | |

The urethane is a clear coat system that is catalyzed when both components are mixed and sprayed to form a hard clear coat.

The following table represents a GM paint cycle the conductive finished part passes through during electrostatic spraying. Prior to electrostatic spray painting, the surface of the conductive coated part is submerged in a 90° F. ELPO plating bath for five minutes. (ELPO is a trademark of PPG.) The paint then passes through a high voltage spray head which charges the paint droplets. The paint then adheres to the grounded surface without significant over-spray. Both laminate and injection molded parts were painted according to the bake cycles dictated by the GM paint line specifications. The grey surface prime was first sprayed at a dry coat weight of 1.2 mils and baked at 250° F. for 20 minutes. Then the blue metallic color base coat was sprayed at a coat weight of 0.9 mils and was exposed to a heat at 160° F. for three minutes. Then the activated clear coat was sprayed on at a coat weight of 1.9 mils and was baked at 250° F. for thirty-nine minutes for the final cure. The result was a Class "A" finish that was tested to GM 4350M exterior paint specifications. The majority of the testing was essentially complete including the most critical cycle testing. The painted surface has passed each test segment of the specification. The parts have passed the Xenon Arc SAE J1960 specification. Test results are summarized as follows:

| Test | Index | Description | Method | Results |
|---|---|---|---|---|
| A | 4.2.1 | Initial Adhesion 610 tape | GM9071P | 99+% |
| B | 4.2.9 | Knife Crosshatch 610 tape | GM9502P | B(Pass) |
| C | 4.2.2 | Humidity Resist. & Adh. 610 tape 96 hours | GM4465P | Pass 99+% |
| D | 4.2.5 | Chip Resist. min. rating of 7 | GM9508P | GM 9 |
| E | 4.2.7 | Dime Scrape | GM9506P | Good Adhesion |
| F | 4.2.6 | Thumbnail Hardness no marring or paint removal | GM9507P | Not Marred |
| G | 4.2.8 | Cure Test | GM9509P | Rating "0" |
| H | 4.2.11 | Gasoline Puddle | GM9500P | Pass |
| I | 4.2.12 | Gasoline Dip | GM9501P | Pass |
| J | 4.2.10 | Mandrel Bend rating pf 0 | GM9503P | N/A |
| K | 4.3.7 | Abrasion Resist. CS10 wheels | GM9515P | N/A |
| L | 4.3.4 | Cold Crack/ Corrosion Cycle 15 cycles/method A | GM9505P | (No effect) Pass |
| M | 4.3.5 | Color Crock ten complete turns | GM9033P | U/T |
| N | 4.3.6 | Oven Aging | GM9504P | Pass |
| O | 4.3.10 | Pencil Hardness | ASTM | Gouge-H |
| P | 4.3.11 | Test Oil Immersion | D3363 Para. 4.3.11 | Scratch-B Pass |
| Q | 4.3.2 | Weatherometer Exposure - Xenon arc 1,000 hours | SAE J1960 | None |
| R | 4.3.1 | Florida Exposure 2 years 5° facing south | GM4350M | U/T |

EXAMPLE 10

Referring to FIG. 10, a 0.8 mil thick conductive coating 22 described in Example 1 was coated on a matte release liner 20 also described in Example 1. The matte release film was laminated to 48 inch wide Lexan, Ultem, and Xenoy sheets. The rolls of laminate shown at 108 were extrusion cap sheet laminated and vacuum formed. Each conductive laminate roll 110 was mounted on an extruder 112. The Xenoy sheet can either be a monolayer extrusion or a 3–5 layer coextrusion with one or more of the layers being filled. The total layer thickness can be between 10 and 200 mils thickness. In this trial, a tri-layer extrusion 114 was formed 150 mils in thickness through a 48" wide die lip. Such a tri-layer extrusion is shown in the embodiment of FIG. 2 in which the extruded layers can be unfilled Xenoy 28a, glass-filled Xenoy 28b and unfilled Xenoy 28c. Referring again to FIG. 10, the conductive laminate was fused to the surface of the extrudate 114 with the heat of the extrudate and the pressure at the nip of the metal rollers 116 and 118. The result was a 170 mil thick conductive sheet 120 ready for vacuum pressure forming into a finished electrostatic sprayable part. The following composites were successfully extrusion laminated and vacuum pressure formed:

| A | B | C |
|---|---|---|
| Cond. Coat | Cond. Coat | Cond. Coat |
| 20 mil Ultem | 20 mil Xenoy | 20 mil Lexan |
| 150 mil Xenoy Extrusion | 150 mil Xenoy Extrusion | 150 mil Xenoy Extrusion |

On a smaller scale, the conductive coating as described in Example 1 was coated on a matte release liner described in Example 1 and laminated to a 150 mil Xenoy coextrusion, resulting in the following construction:

| D |
|---|
| Conductive Coating |
| 25 mil Xenoy |
| 100 mil glass filled Xenoy |
| 25 mil Xenoy |

Each thick conductive sheet was then vacuum pressure formed on a small scale die resulting in a contoured conductive finished part that was electrostatically sprayed as described in Example 9. The conductive primer elongated during forming substantially without affecting surface conductivity which was sufficiently within the electrostatic sprayable range. The painted part has passed GM 4350M testing to date. Outdoor weatherability testing is in process, with initial test results showing that the spray painted parts have passed 1000 hour xenon arc tests.

EXAMPLE 11

Resistivity measurements (in K-ohms/sq.) were made on both a commercial PPG conductive spray-primed fender and a conductive thermoformed laminate fender of the same shape made by the process of this invention as described in Example 10. The conductive coating tested was prepared from the formulation of Example 1. Forty measurements were recorded randomly on the surface of each fender. The following table demonstrates significant statistical improvements in consistency (uniformity of the conductive surface) with the conductive primer (C. Coat) of this invention.

| Sample | Mean | Std. Dev. | 6*St. Dev. |
| --- | --- | --- | --- |
| PPG | 56.6 | 30.2 | 181.2 |
| C. coat | 1.1 | 0.22 | 1.32 |

EXAMPLE 12

The following table shows conductive coatings that have been successfully made in alternate resin systems along with corresponding resistivity measurements expressed in Ransberg units. In each resin formulation, Vulcan XC-72 carbon black at a pigment-to-resin ratio of 0.23 was added and milled for three hours with ⅛ inch shot:

| Resin | Source | Product No. | Ransberg | E.S. Sprayable |
| --- | --- | --- | --- | --- |
| Polyarylate | Hoechst Celanese | DKX-103 | 165+ | Yes |
| Acrylic | Rohm Haas | B-99 | 165+ | Yes |
| Polyetherimide | G.E. | Ultem 1000 | 165+ | Yes |
| Urethane | Ruco | Rucothane Co-A-5002L | 165+ | Yes |

No antiblock TS100 fumed silica was used. Each 0.8 mil coating was applied to the matte release liner as described in Example 1 and resistivity was measured directly on the web.

EXAMPLE 13

A conductive coating described in Example 1 was applied to a matte release liner described in Example 1 and was laminated to a 20 mil thick polyarylate backing sheet. The polyarylate was the DKX-103 material used in Example 12. The polyester carrier remained on the surface during sheet molding trials (SMC) for protection. This laminate is only used for flat sheet SMC applications such as wallboard decorative panels. Compression molding on this structure resulted in a Ransberg resistivity measurement of 165+ units which is electrostatically sprayable.

EXAMPLE 14

A conductive polyarylate film was cast on a two mil thick polyester carrier. The polyarylate film was made using DKX-57 (Hoechst Celanese) having a $T_g$ of about 190° C. The polyarylate conductive film then was laminated to a 20 mil thick polyarylate sheet. Adequate adhesion and release of the carrier were achieved without the use of a matte release coat. Conventional lamination was with a thermoplastic size coat such as Du Pont's acrylic 68080 applied at a thickness of 0.3 mils between the conductive polyarylate film and the 20 mil polyarylate laminate to produce the following structure:

2 Mil Polyester

Conductive Polyarylate

Du Pont 68080 Acrylic Size

20 Mil Polyarylate

The laminate with and without the size coat was vacuum formed into a shell of contoured three dimensional shape. The shell was placed in an SMC mold and compression molded. The shell also can be placed in a TMC mold and plastic injected behind it, resulting in a finished electrostatic sprayable part. That is, the conductive primer coat was sufficiently flexible to elongate during vacuum forming, while still retaining its original level of resistivity; and such resistivity was reasonably uniform across the surface area of the formed parts. When a flat sheet is desired, either laminate can be placed flat in the mold and compression molded.

EXAMPLE 15

A lightly cross-linked conductive coating was formulated with 2.5 parts Desmodur N100, an isocyanate made by Mobay, Inc., with 100 parts of the conductive coating of Example 1. (The Adcote X80-125 is a polyester resin with hydroxyl functionality and is capable of being cross-linked with isocyanites, melamimes, and other functional resins.) The coating was cast on the standard matte release layer at 0.8 mils dry. Both cross-linked conductive coating and standard conductive coating were laminated to a high temperature polyarylate plastic sheet. FIG. 11 illustrates the extrusion laminating system for high temperature laminating the conductive primer film to the extruded sheet. This system is used when laminating to high temperature plastics, such as polyarylates, using high temperature-resistant primer films such as the lightly cross-linked film of this example. Referring to FIG. 11, a continuous extruded sheet 122 of polyarylate is extruded from the die opening of an extruder 124. The high temperature extrusion is first passed between an upper roller 126 and an intermediate level roller 128. The extruded sheet had a thickness of 20 mils. Separately, a high temperature resistant conductive primer film 130 of this invention is fed toward the extruder from a roller 132. The primer film is carried on the matte release coated carrier sheet. The primer film and the extruded sheet are fed to the nip of the intermediate roller 128 and a rubber roller 134 where heat and pressure are applied to soften the coatings and bond the primer film to the extruded sheet. The temperature of the extruded sheet leaving the die exit opening can be over 600° F., and bonding at the nip of the rollers 128 and 134 can be at temperatures in excess of 400° F. The conductive primer coated laminate then undergoes a temperature reduction as it passes around a lower roller 136. After bonding the primer film to the extrusion, the matte release coated carrier is removed, leaving a finished composite sheet 138 comprising a high temperature resistant conductive primer film on the exposed face of the high temperature resistant plastic sheet. Temperature resistance of the conductive surfaces was measured by exposing the coatings to heat at 275° F. for one minute on a 6 lb. metal surface, with the following results:

Cross-linked—no pickoff, smooth

Standard—pickoff, rough.

The conductive laminate was then thermoformed into a contoured shape. Further tests were made with greater degrees of cross-linking the conductive coat resin. The Desmodur N100 isocyanate cross-linking resin was added in 6 parts and in 15 parts to two separate vessels each containing 100 parts of the conductive primer formulation of Example 1. The two resins were coated on a matte release carrier and laminated to a 20 mil polyarylate backing sheet which was then thermoformed into a contoured shape. The results were as follows:

| Sample | Release | Thermoform Shell |
|---|---|---|
| 2 pts/100 | OK | OK |
| 6 pts/100 | OK | OK |
| 15 pts/100 | poor | N.A. |

It was concluded that thermoplastic resins or resins with a small degree of cross-linking are suitable for use in the conductive coat because they can elongate without degrading surface conductivity during molding or thermoforming. Cross-linking of the polyester resin up to about 10 parts cross-linking resin per 100 parts polyester is believed to produce a sufficiently thermoplastic conductive coat to retain electrostatic sprayability.

EXAMPLE 16

Four separate conductive primers were made by varying the pigment-to-binder ratio. In this example, the binder was Hypalon 827B, a chlorinated polyolefin from DuPont. The particulate conductive filler material was XC-72 carbon black. The formulations are listed below:

|  | 1 | 2 | 3 | 4 |
|---|---|---|---|---|
| Hypalon 827B CPO | 100 | 100 | 100 | 100 |
| XC-72 Carbon Black | 23.3 | 17.5 | 11.7 | 5.5 |
| Toluene Solvent | 289 | 289 | 289 | 289 |

Each formulation was made by first dissolving the Hypalon 827B in the toluene solvent and then dispersing the XC-72 carbon black in the blend using ⅛-inch steel shot. Each of these solutions was then cast onto a matte polyester carrier sheet at four thicknesses: 0.75 mil, 0.35 mil, 0.2 mil, and 0.1 mil.

Each sheet was then laminated to a 20 mil thick TPO panel and the matte polyester carrier was then removed, leaving a conductive film laminated to the TPO panel. (The TPO panel is described in more detail in Example 17.) Each of these conductive panels was then vacuum thermoformed over a mold which gave various elongations over the surface.

The amount of elongation over the areas of the mold was determined by molding pieces of 20 mil TPO which had an eight line per inch grid pattern. Measurements were taken along the various surfaces of the mold to determine elongations.

Ransberg resistivity and resistivity in K-ohms/square were measured before thermoforming and at six points on the mold after thermoforming. The readings are shown in Table 1 and Table 2, respectively.

Results show very high resistance and no electrostatic sprayability at a pigment-to-binder ratio of 0.055 at any film thickness. At a pigment-to-binder ratio of 0.117, the 0.1 mil product was not sprayable, and the 0.2 mil product lost sprayability at the higher elongations.

At a pigment-to-binder ratio of 0.175, sprayability was achieved and maintained until the higher elongations of the 0.1 mil product. At a pigment-to-binder ratio of 0.23, sprayability was achieved and maintained throughout all of the samples and elongations.

The conclusion is that sprayability can be maintained through higher elongations by increasing conductive film thickness and/or the pigment-to-binder ratio. Good results are achieved at pigment-to-binder ratios above about 0.175 and at conductive film thicknesses greater than about 0.2 mil.

TABLE 1

(Resistivity in Ransberg Units)

| | Pigment-to-Binder Ratios | | | |
|---|---|---|---|---|
| % Elongation | 0.23 | 0.175 | 0.117 | 0.058 |
| Test A - Thickness: 0.75 mil | | | | |
| .0 | >165 | >165 | 165 | 83 |
| 12.5 | >165 | >165 | 150 | 83 |
| 37.5 | >165 | >165 | 160 | 83 |
| 43.8 | >165 | >165 | 165 | 83 |
| 62.5 | >165 | >165 | 153 | 81 |
| 131 | >165 | >165 | 155 | 81 |
| 156 | >165 | >165 | 155 | 81 |
| Test B - Thickness: 0.35 mil | | | | |
| .0 | >165 | >165 | 152 | 83 |
| 12.5 | >165 | >165 | 152 | 83 |
| 37.5 | >165 | >165 | 152 | 83 |
| 43.8 | >165 | >165 | 150 | 81 |
| 62.5 | >165 | >165 | 151 | 81 |
| 131 | >165 | >165 | 143 | 81 |
| 156 | >165 | >165 | 150 | 81 |
| Test C - Thickness: 0.2 mil | | | | |
| 0 | >165 | 165 | 143 | 83 |
| 12.5 | >165 | 165 | 143 | 83 |
| 37.5 | >165 | 165 | 139 | 83 |
| 43.8 | >165 | 165 | 132 | 82 |
| 62.5 | >165 | 165 | 135 | 81 |
| 131 | >165 | 151 | 83 | 81 |
| 156 | >165 | 151 | 80 | 81 |
| Test D - Thickness: 0.1 mil | | | | |
| 0 | 165 | 149 | 83 | 83 |
| 12.5 | 165 | 155 | 83 | 83 |
| 37.5 | 165 | 145 | 83 | 83 |
| 43.8 | 165 | 140 | 81 | 82 |
| 62.5 | 165 | 145 | 80 | 81 |
| 131 | 147 | 85 | 80 | 81 |
| 156 | 139 | 80 | 80 | 81 |

TABLE 2

(Resistivity in K-Ohms/Sq. Units)

| | Pigment-to-Binder Ratios | | | |
|---|---|---|---|---|
| % Elongation | .23 | 0.175 | 0.117 | 0.058 |
| Test A - Thickness: 0.75 mil | | | | |
| 0 | .5 | 11 | 500 | >500 |
| 12.5 | .4 | 6 | >500 | >500 |
| 37.5 | .45 | 10 | >500 | >500 |
| 43.8 | .9 | 9 | 400 | >500 |
| 62.5 | .6 | 11 | >500 | >500 |
| 131 | 1.4 | 10 | >500 | >500 |
| 156 | 1.2 | 23 | 300 | >500 |
| Test B - Thickness: 0.35 mil | | | | |
| 0 | 1.8 | 8 | >500 | >500 |
| 12.5 | 1 | 30 | >500 | >500 |
| 37.5 | 1.3 | 29 | >500 | >500 |
| 43.8 | 2.5 | 90 | >500 | >500 |
| 62.5 | 2 | 55 | >500 | >500 |
| 131 | 6 | 76 | >500 | >500 |
| 156 | 12 | 55 | >500 | >500 |
| Test C - Thickness: 0.2 mil | | | | |
| .0 | 11.5 | 200 | >500 | >500 |
| 12.5 | 12 | 90 | >500 | >500 |

TABLE 2-continued (Resistivity in K-Ohms/Sq. Units)

| | Pigment-to-Binder Ratios | | | |
|---|---|---|---|---|
| % Elongation | .23 | 0.175 | 0.117 | 0.058 |
| 37.5 | 25 | 110 | >500 | >500 |
| 43.8 | 36 | 300 | >500 | >500 |
| 62.5 | 28 | 180 | >500 | >500 |
| 131 | 70 | 400 | >500 | >500 |
| 156 | 80 | 500 | >500 | >500 |
| Test D - Thickness: 0.1 mil | | | | |
| 0 | 50 | >500 | >500 | >500 |
| 12.5 | 90 | >500 | >500 | >500 |
| 37.5 | 190 | >500 | >500 | >500 |
| 43.8 | 160 | >500 | >500 | >500 |
| 62.5 | 250 | >500 | >500 | >500 |
| 131 | 500 | >500 | >500 | >500 |
| 156 | 500 | >500 | >500 | >500 |

EXAMPLE 17

In this example the process was modified to test adherence of the conductive coat to a TPO panel. The TPO consisted of ethylene propylene rubber dispersed within polypropylene. The conductive coating in the polyester resin system from Example 1 was used to make the TPO sheet conductive by use of an understamp made by first casting a tie coat of DuPont's acrylic 68080 onto a silicone coated release liner from Hoechst Diafoil. The acrylic tie coat was applied at a dry film thickness of 0.3 mil. A water-based clear coat of a chlorinated polyolefin (CPO) from Aline, Al-112, was cast on the tie coat and dried to a film thickness of 0.3 mil. This construction was laminated to a 20 mil thick panel of the TPO. The conductive laminate from Example 1 was then laminated to this construction to produce the following construction:

0.8 mil conductive polyester
0.3 mil acrylic tie coat
0.3 mil chlorinated polyolefin
20 mil TPO This laminate was then vacuum formed over the mold of Example 16 and resistivity measurements were taken in Ransberg units and K-ohms/sq. as follows:

| % Elongation | Ransberg | K-ohms/sg. |
|---|---|---|
| 0 | >165 | 0.11 |
| 12.5 | >165 | 0.11 |
| 37.5 | >165 | 0.11 |
| 43.5 | >165 | 0.11 |
| 62.5 | >165 | 0.20 |
| 131 | >165 | 0.18 |
| 156 | >165 | 0.20 |

The conclusion is that good adhesion of the conductive film can be achieved for a TPO panel when the tie coat is cast separately as an understamp, rather than casting it directly on the conductive coat, and by use of the CPO to enhance adhesion. Casting the tie coat separately, followed by laminating avoids solvent attack of the conductive coat which may occur if the tie coat is cast directly onto the conductive coat. The result is that the conductive coat retains good resistivity levels through a wide range of elongations that simulate three dimensional shaping of the finished panel.

EXAMPLE 18

An acrylic-imide copolymer from Rohm & Haas was used in this example to manufacture a conductive laminate which can be used in an SMC process. The acrylic was HT-510, an amorphous acrylic-imide copolymer having a $T_g$ (glass transition temperature) of 149° C. (The glass transition temperature of a plastic is the temperature at which the plastic transitions from a brittle to a rubbery state.) Most acrylics have a $T_g$ of 105° C. or lower. The SMC process uses mold temperatures greater than about 135° C. This processing temperature melts and destroys any films made from such acrylics. The conductive film made using the HT-510 acrylic-imide appears to survive the SMC process.

The HT-510 was dissolved in methyl ethyl ketone and the XC-72 carbon black using ⅛ shot, with the following formula:

| Ingredient | Parts |
|---|---|
| Methyl Ethyl Ketone | 300 |
| HT-510 Acrylic-imide | 100 |
| XC-72 Carbon Black | 23.3 |

This conductive primer was then coated onto a matte polyester carrier and dried to a dry film thickness of 0.6 mil. An adhesive tie coat of Irostic 160/38 from Iromer Chemie was dissolved in methyl ethyl ketone, with the following formula:

| Ingredient | Parts |
|---|---|
| Methyl Ethyl Ketone | 300 |
| Irostic 16D/38 | 100 |

The tie coat was then coated onto the conductive laminate to a dry film thickness of 0.1 mil. This construction was heat laminated to a 20 mil thick polyarylate sheet to produce the following construction:

0.6 Mil Conductive Acrylic-imide Coat
0.1 Mil Irostic 160/38 Size Coat
20 Mil Polyarylate Sheet Resistivity readings taken in both Ransberg and K-ohms/sq. measured greater than 165 Ransberg units, and 1.0 K-ohms/sq.

This example shows a conductive film can be used in an SMC process and maintained in a coherent state at the higher SMC processing temperatures (above about 149° C.). For material used in an SMC bonding process, it is preferred to use a conductive film and a backing sheet with a $T_g$ of at least about 145° C., and more preferably, a $T_g$ greater than the temperature of the sheet molding process.

The polyarylate backing sheet described herein is one example of a suitable backing sheet; other polyarylate backing sheets which can be used are similar to those described in U.S. Pat. Nos. 4,959,189 and 5,001,000, incorporated herein by reference.

What is claimed is:

1. A plastic body panel having a primed outer surface adapted for application of an electrostatically spray painted paint coat, the body panel comprising:

a thermoformable semi-rigid polymeric face sheet made of a thermoplastically formable polymeric material which has been thermoformed into a three-dimensionally contoured shape, and an electrically conductive thermoformable polymeric primer coat comprising a dry paint transfer film bonded to an exterior contoured surface region of the thermoformed polymeric face sheet, the/conductive dry paint transfer film comprising a thermoplastically formable polymeric material containing a dispersed conductive material providing electrical conductivity to an exposed surface of the film, the conductive dry paint transfer film having regions thereof which have been subjected to elongation in forming the contoured face sheet, the conductive dry paint transfer film having a retained Ransberg resistivity value of at least about 110 units for providing an electrostatically sprayable surface resistivity to the exposed contoured outer surface of the sheet.

2. The panel according to claim 1 in which the outer surface of the primer coat has a transferred microroughness.

3. The panel according to claim 1 in which the conductive primer coat comprises a polymer resin having a uniformly dispersed particulate conductive filler, the resin being selected from the group consisting of polyester, acrylic, polyarylate, urethane and polyetherimide resins.

4. The panel according to claim 3 in which the conductive filler comprises carbon black.

5. The panel according to claim 1 in which the panel further includes a size coat on a surface of the face sheet opposite from the conductive film, and a molded polymeric substrate panel bonded to the thermoformed face sheet via adhesive bonding to the size coat.

6. The panel according to claim 1 in which the conductive primer coat comprises a thermoplastic or lightly cross-linked thermoset resin having no more than about ten parts cross-linking resin per 100 parts thermoplastic resin.

7. The panel according to claim 1 in which the conductive primer coat comprises a thermoset resin and in which the sheet to which it is bonded is a thermoset molding material.

8. The panel according to claim 1 in which the conductive primer has a reflectivity greater than about 70% to provide an EMI/RF shielded panel.

9. An exterior automotive plastic body panel having a primed outer surface adapted for application of an electrostatically spray painted exterior automotive paint coat, comprising:

a thermoformable semi-rigid polymeric face sheet made of a thermoplastically formable polymeric material which has been thermoformed into a three-dimensionally contoured shape, an electrically conductive thermoformable polymeric primer coat paint transfer film to an contoured surface region of the thermoformed polymeric face sheet, the conductive dry paint transfer film comprising a thermoplastically formable polymeric material containing a dispersed conductive material providing electrical conductivity to an outer surface of the film, the conductive dry paint transfer film having regions thereof which have been subjected to elongation in forming the contoured face sheet, the outer surface of the conductive dry paint transfer film having a retained Ransberg resistivity value of at least about 110 units for providing an electrostatically sprayable surface resistivity to the contoured outer surface of the sheet, a molded polymeric substrate panel bonded to the thermoformed face sheet, and an exterior automotive quality paint coat with a Class "A" finish applied to the outer surface of the primer coat.

10. The panel according to claim 9 in which the outer surface of the primer coat has a transferred microroughness.

11. The panel according to claim 9 in which the conductive primer coat comprises a polymer resin having a uniformly dispersed particulate conductive filler, the resin being selected from the group consisting of polyester, acrylic, polyarylate, urethane and polyetherimide resins.

12. The panel according to claim 9 in which the conductive filler comprises carbon black.

13. The panel according to claim 9 in which the conductive primer coat comprises a thermoplastic or lightly cross-linked thermoset resin.

14. A shaped plastic automotive body part having a primed outer surface adapted for application of an electrostatically spray painted paint coat, the body part comprising:

a semi-rigid thermoformable polymeric face sheet made of a thermoplastically formable polymeric material which has been thermoformed into a three-dimensionally contoured shape, an electrically conductive thermoformable polymeric primer coat comprising a dry paint transfer film bonded to an exterior contoured surface region of the thermoformed polymeric sheet, the conductive dry paint transfer film comprising a thermoplastically formable polymeric material containing a dispersed conductive material providing electrical conductivity to an outer surface of the conductive film, the conductive dry paint transfer film having regions thereof which have been subjected to elongation in forming the contoured face sheet, the conductive dry paint transfer film having a retained Ransberg resistivity value of at least about 110 units for providing an electrostatically sprayable surface resistivity to the contoured outer surface of the sheet, and an exterior automotive quality paint coat with a Class "A" finish applied to the outer surface of the conductive film.

15. A shaped automotive body part according to claim 14 in which the conductive primer coat comprises a thermoplastic or lightly cross-linked thermoset resin having no more than about ten parts cross-linking resin per 100 parts thermoplastic resin.

16. A plastic body panel having a primed outer surface adapted for application of an electrostatically spray painted paint coat, the body panel comprising:

a semi-rigid thermoformable polymeric face sheet made from thermoplastically formable polymeric material which has been thermoformed into a three-dimensionally contoured shape, the face sheet having a thickness in the range from about 10 to about 200 mils, an electrically conductive thermoformable polymeric primer coat comprising a dry paint transfer film bonded to an exterior contoured surface region of the thermoformed polymeric sheet, the polymeric material containing a dispersed conductive material providing electrical conductivity to an exposed outer surface of the film, the outer surface of the conductive dry paint transfer film having a microroughness transferred to it from replicating contact with a carrier on which the dry paint transfer film is formed, the conductive dry paint transfer film having regions thereof which have been subjected to elongation in forming the contoured face sheet, the conductive film having a retained Ransberg resistivity value of at least about 110 units for providing an electrostatically sprayable surface resistivity to the contoured outer surface of the sheet.

17. A body panel according to claim 16 in which the conductive primer coat comprises a thermoplastic or lightly cross-linked thermoset resin having no more than about ten parts cross-linking resin per 100 parts thermoplastic resin.

\* \* \* \* \*

UNITED STATES PATENT AND TRADEMARK OFFICE
CERTIFICATE OF CORRECTION

PATENT NO. : 5,686,186
DATED : November 11, 1997
INVENTOR(S) : Howard H. Enlow; Scott W. Huffer; Frederick Young; William J. Buehne It is certified that error appears in the above-indentified patent and that said Letters Patent is hereby corrected as shown below:

Item [57]
Abstract, Line 9, change "micro-toughened" to -- micro-roughened --.
Abstract, line 15, before "underlying" change "a" to -- an --.
Column 11, line 25, change "MIBK/IPOH Blend (85/25)" to
  -- MIBK/IPOH Blend (85/15) --.
Column 17, line 22, change "areas" to -- area --.
Column 19, line 59, change "rating pf 0" to -- rating of 0 --.
Column 22, line 24, change "isocyanites" to -- isocyanates --.
Column 25, line 40, after "20 mil TPO" begin a new paragraph with
  "This laminate . . . ."
Column 25, line 45, change "K-ohms/sg." to -- K-ohms/sq. --.
Column 26, line 30, change "Irostic 16D/38" to -- Irostic 160/38 --.
Column 27, line 1, change "the/conductive" to -- the conductive --.
Column 27, line 44, change "an contoured" to -- a contoured --.

Signed and Sealed this

First Day of December, 1998

BRUCE LEHMAN

Attest:

Attesting Officer

Commissioner of Patents and Trademarks